United States Patent [19]
Guzak et al.

[11] Patent Number: 5,838,319
[45] Date of Patent: Nov. 17, 1998

[54] SYSTEM PROVIDED CHILD WINDOW CONTROL FOR DISPLAYING ITEMS IN A HIERARCHICAL FASHION

[75] Inventors: Christopher J. Guzak; Jeffrey L. Bogdan, both of Kirkland; George H. Pitt, III; Chee Heng Chew, both of Redmond, all of Wash.

[73] Assignee: Microsoft Corporation, Redmond, Wash.

[21] Appl. No.: 886,777

[22] Filed: Jul. 1, 1997

Related U.S. Application Data

[63] Continuation of Ser. No. 355,408, Dec. 13, 1994, abandoned.

[51] Int. Cl.⁶ .................................................. G06F 3/00
[52] U.S. Cl. ........................................ 345/340; 345/356
[58] Field of Search .................................. 345/356, 357, 345/340

[56] References Cited

U.S. PATENT DOCUMENTS

| | | | |
|---|---|---|---|
| 5,065,347 | 11/1991 | Pajak et al. | 395/159 |
| 5,297,253 | 3/1994 | Meisel | 395/160 |
| 5,305,435 | 4/1994 | Bronson | 395/159 |
| 5,317,686 | 5/1994 | Salas et al. | 395/157 |
| 5,333,254 | 7/1994 | Robertson | 395/155 |
| 5,361,361 | 11/1994 | Hickman et al. | 395/700 |
| 5,701,137 | 12/1997 | Kiernan et al. | 345/340 |

OTHER PUBLICATIONS

"Opening Books and Topics," *Microsoft Developer Network Development Library*, Disc Six, Winter 1994.
*Microsoft Windows Version 3.1 User's Guide,* Microsoft Corporation, 1992, Chap. 4, "File Manager," pp. 91–138.

*Primary Examiner*—A. Katbab
*Attorney, Agent, or Firm*—Christensen O'Connor Johnson & Kindness PLLC

[57] ABSTRACT

A tree view control is provided as a system resource that may be used by application programs. The tree view control enables an application program to display a hierarchical list of items. The hierarchical list of items may be expandable or collapsible so as to vary the view of the hierarchical tree that is visible to a user. The expansion and collapsing of the tree is performed by a mechanism that is independent of the selection mechanism that is used to select items in the hierarchical tree. An in-place editing mechanism is provided to facilitate the in place editing of labels of items in the hierarchical tree. As an optimization, the tree view control may provide for deferred evaluation of items such that the display information needed to display an item on an output device is not evaluated until needed.

27 Claims, 14 Drawing Sheets

SYSTEM PROVIDED CHILD WINDOW CONTROL FOR DISPLAYING ITEMS IN A HIERARCHICAL FASHION

CROSS-REFERENCE TO RELATED APPLICATION

This application is a continuation of U.S. Pat. application No. 08/355,408, filed Dec. 13, 1994, now abandoned.

TECHNICAL FIELD

The present invention relates generally to data processing systems and, more particularly, to displaying items in a hierarchical fashion in a data processing system.

BACKGROUND OF THE INVENTION

In conventional systems, if application programs wish to display a hierarchical list of items, they must provide the code and data structures for displaying the list. This task can prove to be quite time-consuming and difficult. Unfortunately, conventional operating systems do not afford any relief as they do not provide support for applications to display such a hierarchical list of items.

SUMMARY OF THE INVENTION

The above described difficulties are overcome by the present invention. In accordance with a first aspect of the present invention, a method is practiced in a computer system that has an output device and a processor for running a first application program. In accordance with this method, a child window control is provided as a system resource. This child window control may be used by one or more application programs to display a list of items as a hierarchical tree on the output device. The child window control may support the hierarchical tree of items being expandable to show additional levels of items, and/or collapsible to hide levels of items.

In accordance with a second aspect of the present invention, a hierarchical tree of items, having at least two levels, is displayed on an output device. In response to a user using an input device, one of the items that is displayed in the hierarchical tree of items is selected. A visual cue may be provided for identifying the selected item. The hierarchical tree of items may be expanded or collapsed or the selection may remain constant so that the expansion or contraction does not affect which item is currently selected.

In accordance with another aspect of the present invention, a method is practiced wherein the computer system is a storage that holds an application program and code for managing a window that displays a hierarchical tree of items. In accordance with this method, a callback function for obtaining display information for one of the items displayed in the hierarchical tree of items is registered with an application program. The callback function is then called from code for managing a window to obtain display information for selecting one of the items in the hierarchical tree to display the item as part of the hierarchical tree that is visible in the window.

In accordance with a further aspect of the present invention, a hierarchical tree of items is displayed in a window on an output device. Each item in the hierarchical tree has a label that is displayed for the item. A mechanism for in-place editing is used to enable the user to perform in-place editing of the label of one of the items in the hierarchical tree.

In accordance with an additional aspect of the invention, the computer system includes an output device and a storage device. The storage device holds the first application program and code for a child window control. The child window control is a system resource that may be used by the first application program to display a list of items as a hierarchical tree of items. The hierarchical tree of items has at least two levels of items. The computer system also includes a processor for running the first application program and the code for the child window control to display the list of items as the hierarchical tree on the output device.

BRIEF DESCRIPTION OF THE DRAWINGS

The preferred embodiment of the present invention will be described in more detail below with reference to the following drawings.

DETAILED DESCRIPTION OF THE INVENTION

The preferred embodiment of the present invention provides a tree view control that is part of an operating system. The tree view control enables programs to display a hierarchical list of items in a window. The tree view control is a child window control that is available for application programs to use and eliminates the need to provide customized code to display data items in a hierarchical fashion. The tree view control provides the ability to expand or contract the tree of items that is shown to a user. This mechanism for expanding or contracting the tree is independent of a currently selected item in the tree. The labels associated with items may be edited in place. Furthermore, optimization mechanisms are provided within the tree view control to defer evaluation of information until needed so as to decrease memory requirements.

Figure 1:
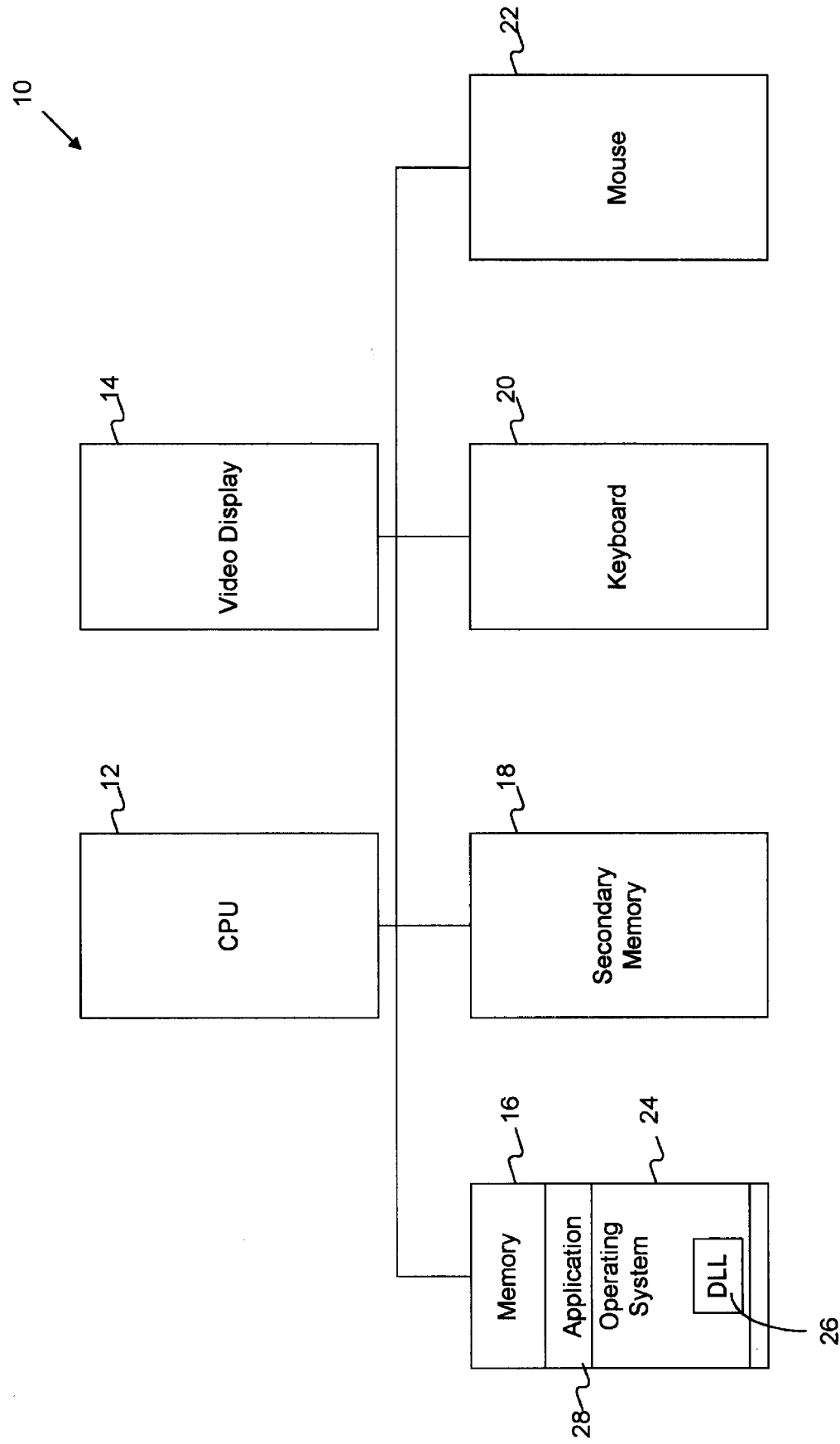
FIG. 1 is a block diagram of a computer system that is suitable for practicing the preferred embodiment of the present invention.

FIG. 1 is a block diagram of a computer system 10 that is suitable for practicing the preferred embodiment of the present invention. Those skilled in the art will appreciate that the computer system 10 shown in FIG. 1 is intended to be merely illustrative and that the present invention may also be practiced in other computer systems that have different configurations.

The computer system 10 of FIG. 1 includes a central processing unit (CPU) 12 that is coupled to a video display 14, a keyboard 20, and a mouse 22. The CPU 12 has access to a primary memory 16 and a secondary memory 18. The primary memory 16 may be realized as a number of different types of memory devices, including RAM devices, ROM devices, EPROM devices or EEPROM devices. The secondary memory 18 may be of any of a number of different secondary storage devices, including a hard disk device. Primary memory 16 holds a copy of an operating system 24. For purposes of discussion below, it will be assumed that the operating system 24 is the "MICROSOFT" WINDOWS 95 operating system from Microsoft Corporation of Redmond, Wash. The operating system 24 includes a dynamic link library (DLL) 26 that contains code structures and messages for implementing the tree view control. The DLL 26 may also include code for implementing additional controls. Those skilled in the art will appreciate that the present invention need not be implemented through a DLL and also need not be implemented as part of an operating system, but rather may be implemented as a separate system resource. The primary memory 16 also holds one or more application programs 28.

Figure 2:
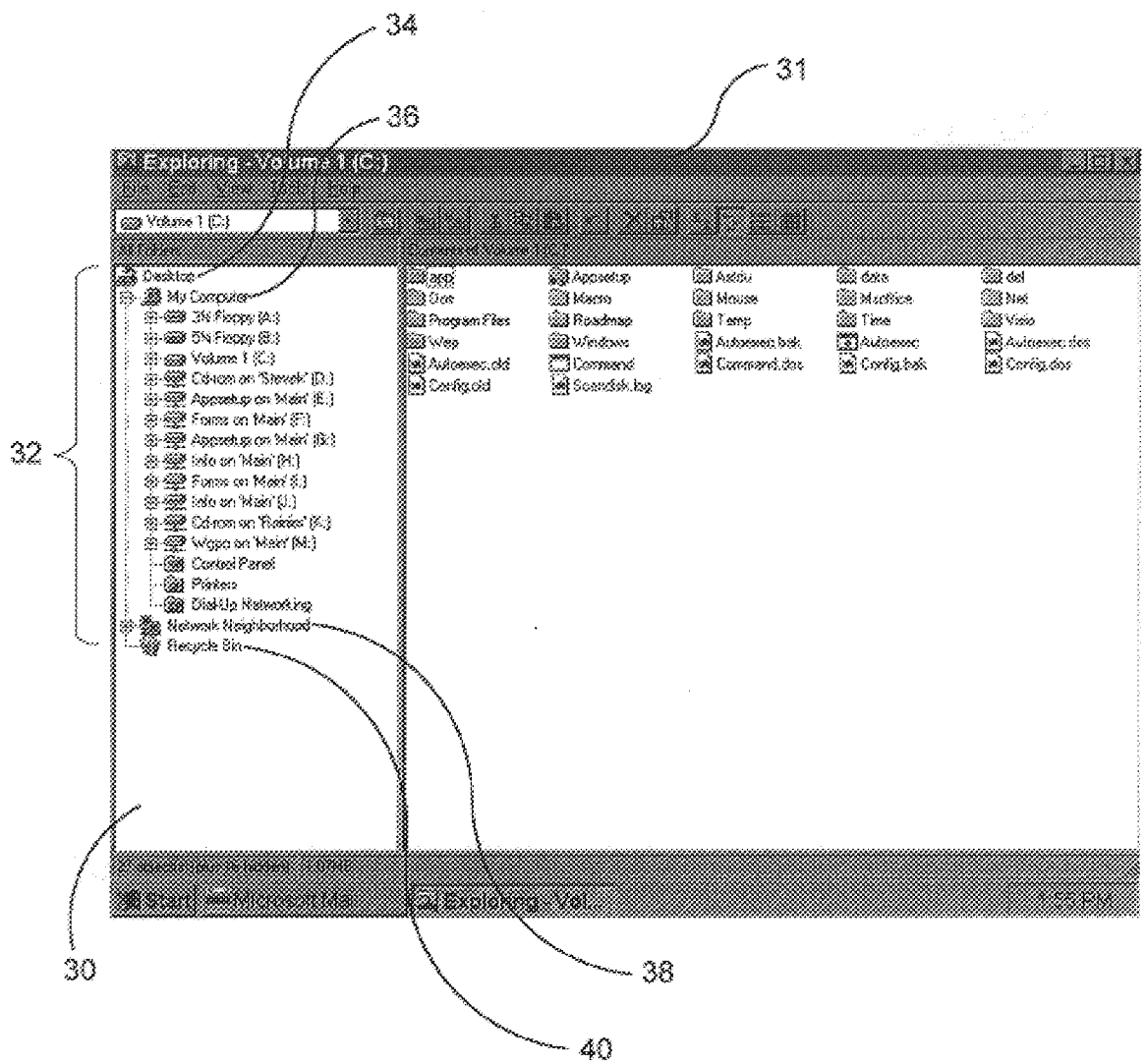
FIG. 2 is an example illustrating use of a tree view control in accordance with the preferred embodiment of the present invention.

FIG. 2 shows an example of a tree view control 30. The tree view control 30 is manifested as a window within a parent window 31. As mentioned above, the tree view control is a child window control. As such, the tree view control sends notification messages to its parent window when events, like user input, occur within the tree view control. The tree view control 30 displays a hierarchical view of items 32. The items are organized as a tree. In the example shown in FIG. 2, the "Desktop" item 34 is the root of the tree and includes children items "My Computer" 36, "Network Neighborhood" 38, and "Recycle Bin" 40. The "My Computer" item 36 includes a number of children items (which are also grandchildren of the "Desktop" item 34). Thus, in this example, the items are displayed as a tree having multiple levels. As will be described in more detail below, the items 32 are also stored as a tree that is part of the tree view control.

Figure 3:
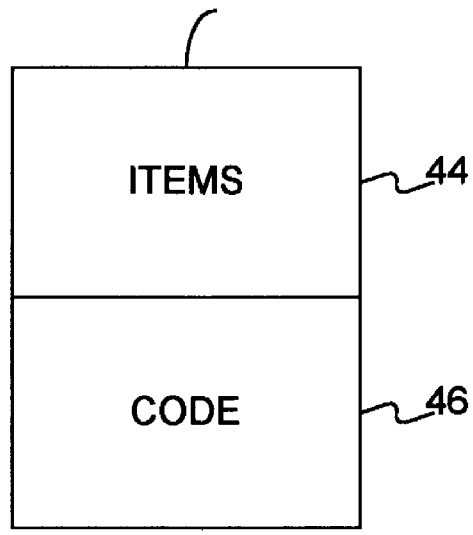
FIG. 3 is a block diagram showing a programmatic representation of a tree view control in accordance with the preferred embodiment of the present invention.

As shown in FIG. 3, from a programming perspective, a tree view control 42 may be viewed as including a list of items 44 and code 46 for displaying and manipulating the items 44. The items 44 and the code 46 will be described in more detail below.

Figure 4:
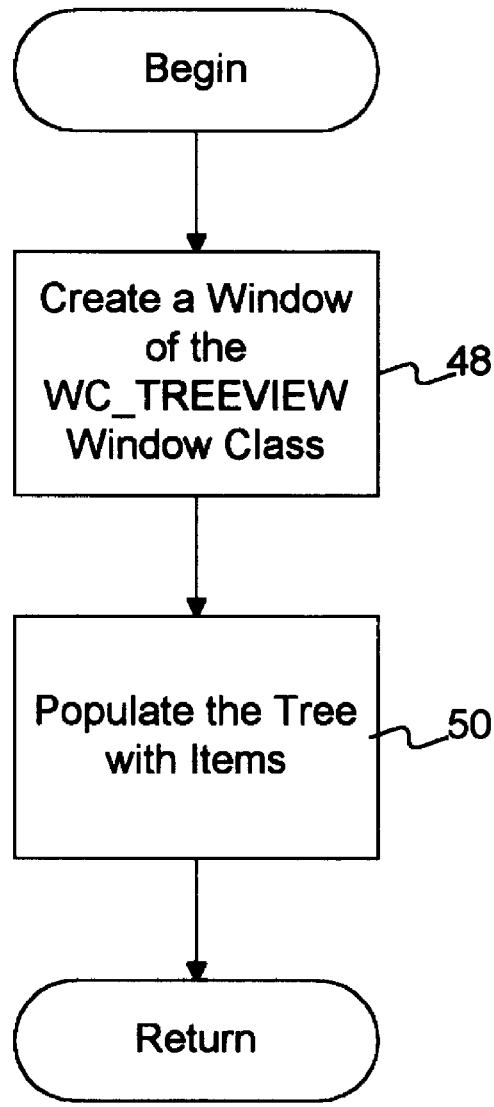
FIG. 4 is a flow chart illustrating the steps that are performed to create a tree view control in accordance with the preferred embodiment of the present invention.

Each window displayed on the video display 14 has an associated window procedure that processes messages that are destined for the window. The operating system 24 supports the notion of a window class that identifies the window procedure for processing messages for a window of that class. The operating system 24 defines a special window class, WC_TREEVIEW, for tree view controls. In order to create a tree view control like that shown in FIG. 2, a programmer follows the steps shown in the flowchart of FIG. 4. In particular, a programmer creates a window of the WC_TREEVIEW window class by calling the CreateWindowEx( ) function that is provided by the operating system 24 (step 48 in FIG. 4). The CreateWindowEx( ) function is defined as part of the "MICROSOFT" "WIN32" API to be a function that creates windows with an extended style. The tree of items to be displayed by the tree view control must then be populated (step 50 in FIG. 4). In other words, items must be added to the tree view control so that they are properly added as part of the tree of items displayed by the tree view control.

Figure 5:
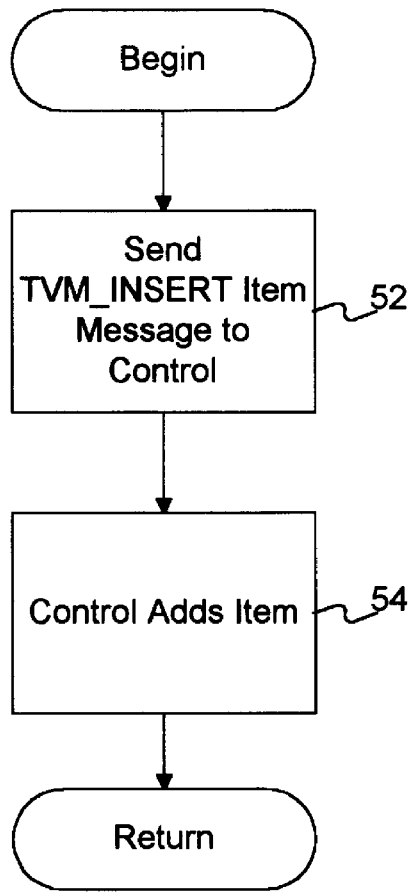
FIG. 5 is a flow chart illustrating the steps that are performed to insert an item into a tree view control in the preferred embodiment of the present invention.

Items are added, removed, and otherwise manipulated by sending messages to the tree view control. FIG. 5 is a flowchart of the steps that are performed to add an item to the tree view control. A TVM_INSERTITEM message is sent to the tree view control to insert an item into the tree displayed by the control (step 52 in FIG. 5). A pointer to an TV_INSERTSTRUCT data structure is passed as part of this message to the tree view control. The TV_INSERTSTRUCT data structure has the following form (in C++):

```
typedef struct _TV_INSERTSTRUCT { // tvins
    HTREEITEM hParent;
    HTREEITEM hInsertAfter;
    TV_ITEM item;      // information about item to add
} TV_INSERTSTRUCT, FAR *LPTV_INSERTSTRUCT;
```

This data structure includes a hParent field that holds a handle (i.e., a unique identifier) to a parent item in the tree. The parent item is the parent in the tree hierarchy of the item that is to be added. If the item to be added is a root of the tree, the item to be added has no parent, and the handle assumes a special value that designates the item as the root of the tree. The hInsertAfter field of TV_INSERTSTRUCT holds the handle of an item after which the new item is to be inserted in the list of items 44 (FIG. 3). This field allows the system to know where to insert the item in the tree. The final field of the structure holds a data structure for the item to be added. This data structure is of the TV_ITEM data type.

The TV_ITEM data type holds information about an item and data structures of these types are stored in primary memory 16 (FIG. 1) and/or secondary memory 15 as items 44 (FIG. 3). This data structure is of the following format:

```
typedef struct _TV_ITEM { // tvi
    UINT           mask;
    HTREEITEM      hItem;
    UINT           state;
    UINT           stateMask;
    LPSTR          pszText;
    int            cchTextMax;
    int            iImage;
    int            iSelectedImage;
    int            cChildren;
    LPARAM         lParam;
} TV_ITEM, FAR *LPTV_ITEM;
```

The "masks" field of this structure holds an array of flags that indicates which of the other fields in the data structure contain valid data or are to be filled in with data. The "state" field specifies a current state of the item. Possible states that an item may assume will be described in more detail below. The "stateMask" field holds a bit mask that identifies which of the states are valid states for the associated item. The "pszText" field holds a pointer to a location that contains text associated with the item. This field holds the text that is displayed in the label of the item. The "cchTextMax" field holds the size of the buffer that is pointed to by the psztext field.

The "iImage" field holds an index to an icon associated with the item and which is to be displayed in the tree view control beside the text for the item when the item is not selected. The index identifies the icon within an image list. The "iSelectedImage" field holds an index to a selected icon image within the image list that is displayed when the item is selected. If this value is null, the image identified by the "iImage" field is shown both when the item is selected and when the item is not selected. The "cChildren" field holds a value that specifies the number of children that are associated with the item.

Given the information contained within the TVM_INSERTITEM message, the tree view control knows where to insert the item and possesses the requisite data for inserting the item into the tree. Hence, in step 54 of FIG. 5, the tree view control adds the item to the tree.

As was discussed above, each item within the tree has associated state information. This state information may identify whether an item has been selected by a user, whether an item has been expanded to show its children in the tree view or other state information about an item. The possible states for items include the following:

| | |
|---|---|
| TVIS_CUT | The item is selected as part of a cut and paste operation. |
| TVIS_DISABLED | The item is disabled and is drawn using the standard disabled style and coloring. |
| TVIS_DROPHILITED | The item is selected as a drag-and-drop target |
| TVIS_EXPANDED | The item's list of child items is currently expanded (that is, the child items are visible). This state applies only to parent items. |
| TVIS_EXPANDEDONCE | The item's list of child items has been expanded at least once. This state applies only to parent items. |
| TVIS_FOCUSED | The item has the focus and is surrounded by a standard focus rectangle. |
| TVIS_OVERLAYMASK | The item's overlay image is included when the item is drawn. |
| TVIS_SELECTED | The item is selected. |
| TVIS_STATEIMAGEMASK | The item's state image is included when the item is drawn. |

As mentioned above, an icon associated with items may be stored in image lists. Image lists are described in more detail in a copending application entitled "System Provided Child Window Controls," Ser. No. 08/355,400, filed on even date herewith. Each item in the tree view control may have a pair of bitmap images associated with it. In general, only one of the images appears at a time on the left-hand side of an item's label. In some instances, more than one image may be displayed. In particular, one image is displayed when the item is selected, an other image is displayed when the item is not selected. For example, a folder item might display an open folder when it is selected and a closed folder when it is not selected.

Figure 6:
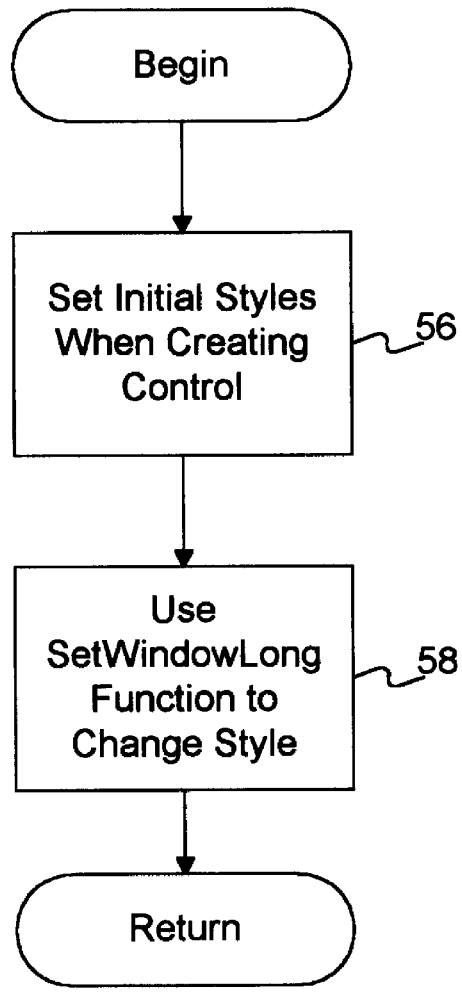
FIG. 6 is a flow chart illustrating the steps that are performed to establish styles for a tree view control in the preferred embodiment of the present invention.

A tree view control has different styles to govern aspects of the appearance of the tree view control. The initial style of a tree view control is set when the tree view control is created (step 56 in FIG. 6). The style of the tree view control may be changed by calling the SetWindowLong( ) function, as defined in the "MICROSOFT" "WIN32" API (step 58 in FIG. 6).

Figure 7A:
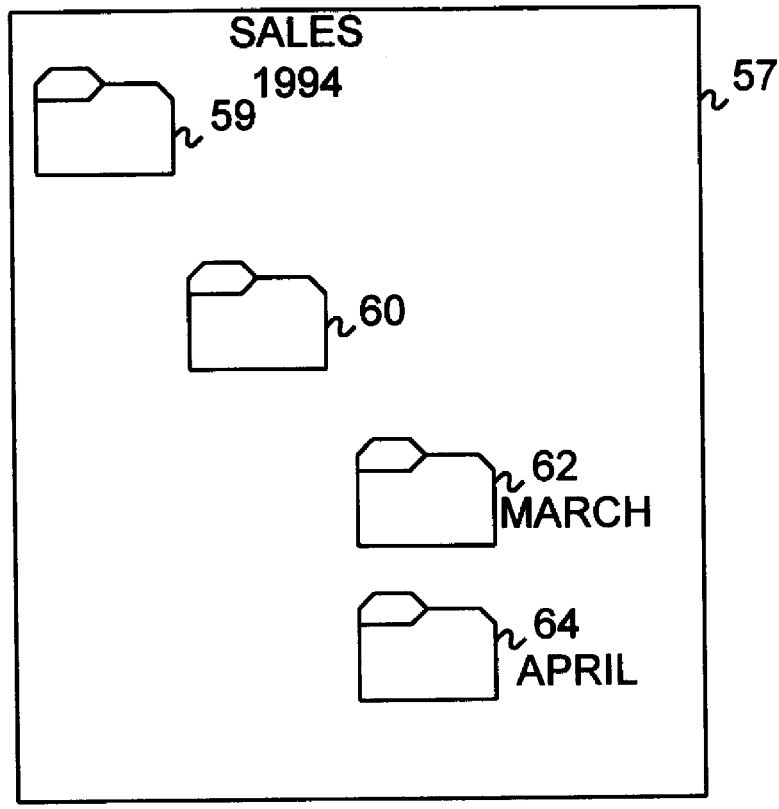
FIGS. 7A, 7B, and 7C illustrate different styles that are available for tree view controls in the preferred embodiment of the present invention.

In order to fully appreciate the implications of the different styles, it is perhaps best to examine a few examples of tree view controls wherein the styles are shown. FIG. 7A shows a small tree of items- that is displayed as part of a tree view control 57. The tree of items includes folders 59, 60, 62, and 64. The "sales" folder 59 is the root of the tree, and the "1994" folder 60 is on the next level of the tree hierarchy, as indicated by the indentation. The "1994" folder 60 includes children folders "March" 62 and "April" 64. The representation of the tree view control 57 shown in FIG. 7A does not have any style settings set.

Figure 7B:
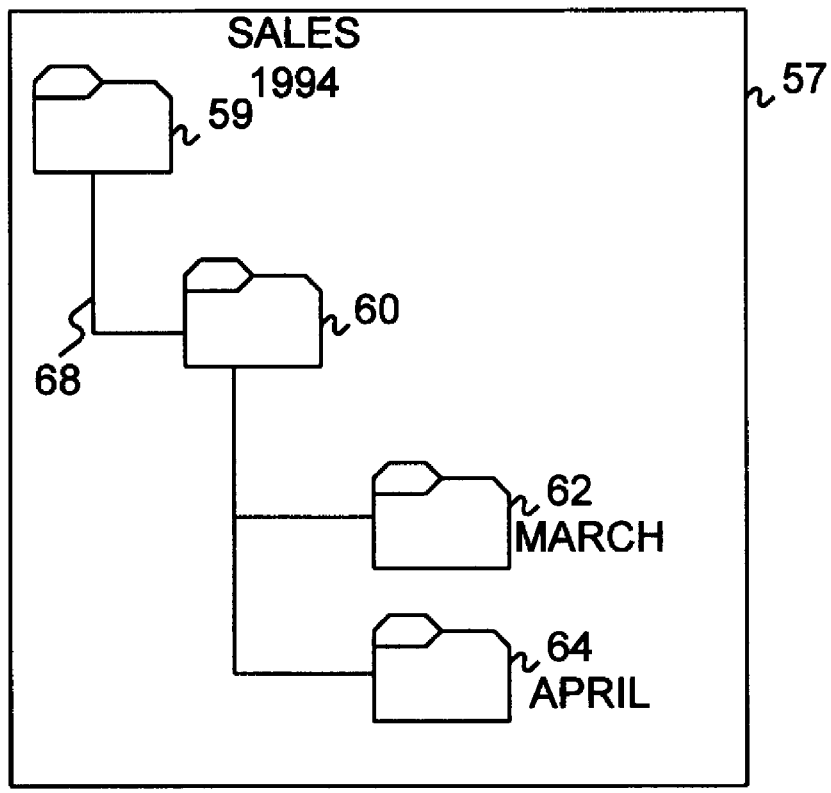

The TVS_HASLINES style may be set to enhance the graphic representation of a tree view control hierarchy by drawings lines that link child items to the corresponding parent item. It should be noted that this style setting does not link items at the root of the tree view. In order to link items at the root of the tree view, the TVS_LINESATROOT style must be set. FIG. 7B shows an example of the tree view of FIG. 7A with the TVS_HASLINES and the TVS_LINESATROOT styles set. Lines 66 are added by setting the TVS_HASLINES style, and lines 68 are added by setting the TVS_LINESATROOT style.

Figure 7C:
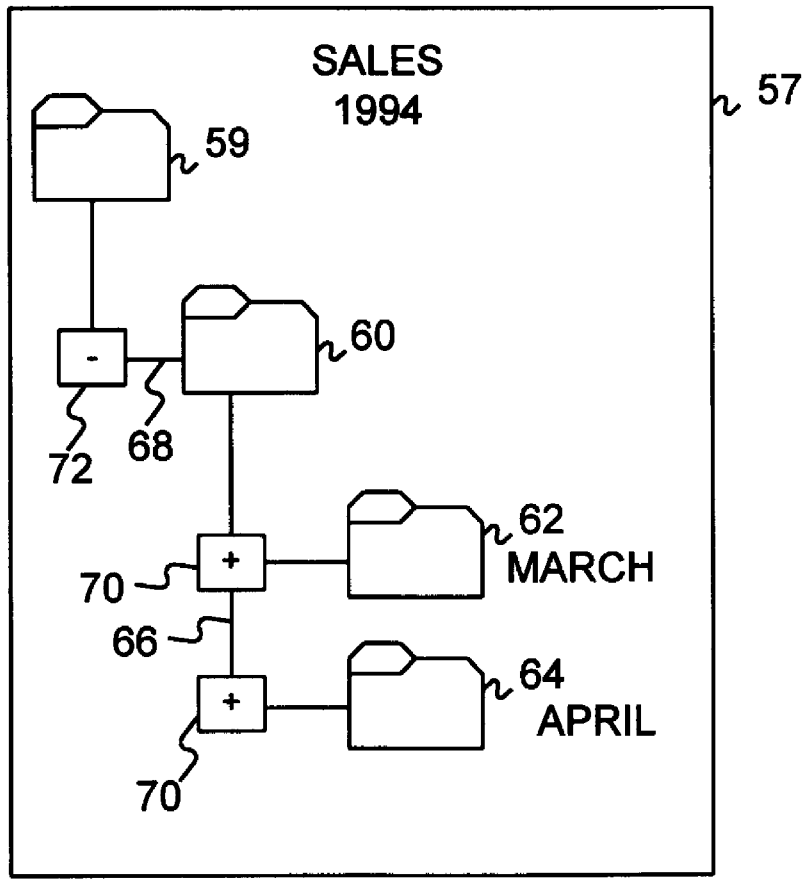

The style of the tree view hierarchy may also be further embellished by setting the TVS_HASBUTTONS style that adds a button to the left side of each parent item. A "+" button may be displayed beside a parent item so that a user may click on the button to expand an item to show its children, and a "−" button may be displayed so that a user may click on the button to collapse an expanded item (so that its children are no longer displayed). FIG. 7C shows an example of the tree of FIGS. 7A and 7B, wherein "+" buttons 70 and "−" button 72 have been added (assuming that folders 62 and 64 may be further expanded). The mechanism for expanding and collapsing the tree is independent of the selection mechanism that is used to select tree items. As such, the tree may be expanded and collapsed without changing the current selection.

A user may incrementally explore the tree shown in tree view using the "+" buttons and "−" buttons and by double-clicking on items. Moreover, the "*" key or the keyboard may be used to fully expand a sub-tree.

Figure 8:
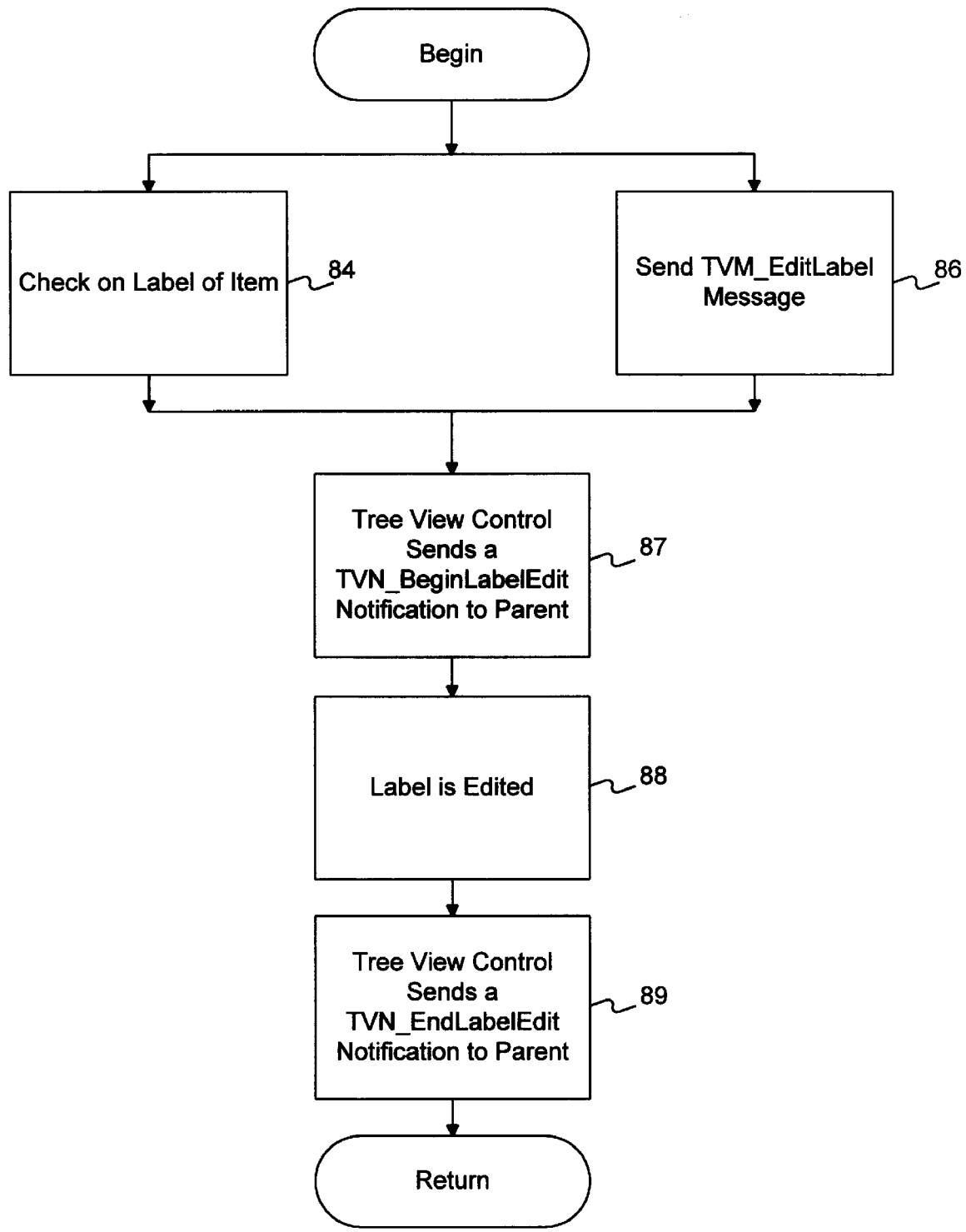
FIG. 8 is a flow chart illustrating the steps that are performed to facilitate in-place editing of item labels in the preferred embodiment of the present invention.
Figure 9:
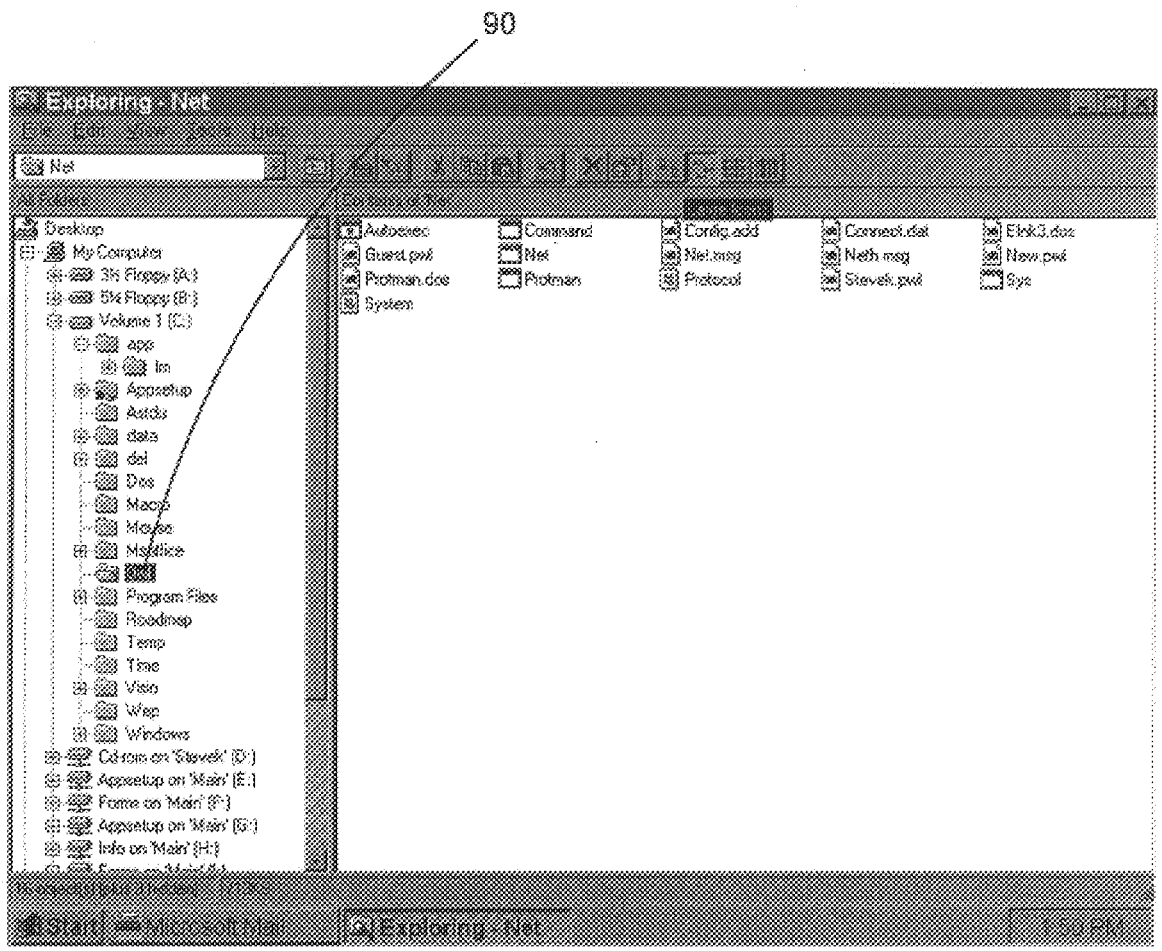
FIG. 9 is an example of a tree view control that illustrates in-place editing of an item label in the preferred embodiment of the present invention.

An additional style, the TVS_EDITLABELS style is provided to make it possible for the user to edit the labels of tree view items. FIG. 8 is a flowchart illustrating the steps that are performed to edit the label of a tree view item. The editing of the label of a tree view item may be initiated by either clicking on the label of the item with a mouse (step 84) or by an application sending a TVM_EDITLABEL message to the tree view control (step 86). The tree view control informs its parent window that editing has begun by sending a TVN_BEGINLABELEDIT notification (step 87). The parent window may refuse the editing if it wishes, so that no edits are accepted. The label may then be edited by simply typing in a new label for the item or by providing a new value for the label (step 88). When editing is complete, the tree view control sends a TVN_ENDEDITLABEL notification to its parent window to inform the parent that editing of the label is complete (step 89). FIG. 9 shows an example where the label 90 for an item has been changed from "Lex 27" to "Owl." Once the editing is complete the label assumes the newly edited value.

As has been discussed above, a tree view control communicates with its parent via notifications that are encapsulated into WM_NOTIFY window messages. A number of these notifications relate to drag-and-drop operations. The TVN_BEGINDRAG notifications is sent to signal the start of a drag-and-drop operation using a left mouse button. The TVN_BEGINRDRAG notification is sent to signal the start of a drag-and-drop operation using the right mouse button.

Notifications are also provided to perform activities relative to displaying items in a tree view control. The TVN_GETDISPINFO notification requests that information required to display an item be obtained for a tree view control. The TVN_SETDISPINFO notification notifies a parent that it must update the information that is maintained for an item. These notifications are also encapsulated in WM_NOTIFY window messages.

Other notifications include the TVN_DELETEITEM notification that signals the deletion of a specific item within the tree view control. The TVN_ITEMEXPANDED notification signals that a parent's list of child items has been either expanded or collapsed. The TVN_ITEMEXPANDING notification signals that the list of child items for a parent is about to be expanded or collapsed. The TVN_KEYDOWN notification signals a keyboard event and identifies the key. A failure reply from the parent in response to TVN-KEYDOWN tells the tree view control to not process the key. The TVN_SELCHANGED notification signals that a selection has been changed from one item to another. Lastly, the TVN_SELCHANGING notification signals that the selection is about to be changed from one item to another. The TVN_ENDLABELEDIT and TVN_BEGINLABELEDIT notifications have been discussed above.

It should be appreciated that the notifications give the parent an opportunity to refuse an action. For example, upon receiving a TVN-SELCHANGING message, a parent may refuse and abort the change.

Figure 10:
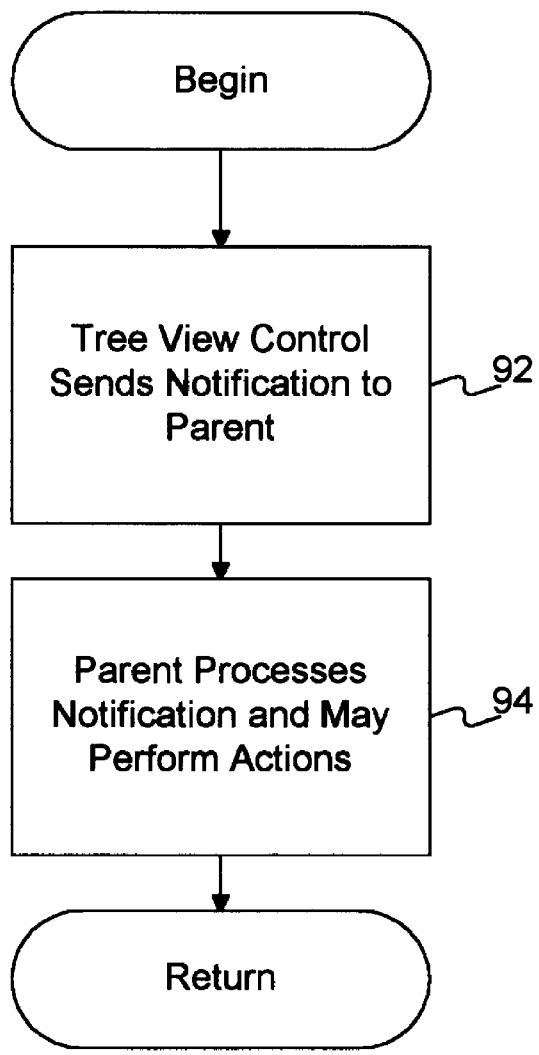
FIG. 10 is a flow chart illustrating the steps that are performed to use notifications in the preferred embodiment in the present invention.

FIG. 10 is a flowchart showing the basic steps performed to utilize notifications within the preferred embodiment of the present invention. In particular, the tree view control sends a notification to the parent to inform parent of events (step 92). The parent then processes the notification as it sees fit and may perform activities in response to the notification (step 94). In some instances, no further action is taken. The notification is sent purely to notify.

A parent application sends messages to add items and to control the appearance behavior of a tree view control. Each message has a corresponding macro that may be executed. The macro results in the corresponding message being sent. Amongst these messages are standard window messages and messages that are particularly directed to the new controls. The latter type of messages include the TVM_DELETEITEM message that requests a specified item (identified by a parameter) be deleted from a tree view window. The TVM_EDITLABEL message is sent to begin in-place editing of a specified item's label. The item is identified by passing its handle as a parameter in the message or in the macro call.

The TVM_EXPAND message is sent to expand or collapse a list of child items associated with a parent item. A handle to the parent item is passed in the message or is a parameter to the macro call. When expansion is about to begin the TVM_ITEMEXPANDING notification is sent and when the expansion is completed, the TVM_ITEMEXPANDED notification is sent to the parent window. Another of the parameters identifies whether the parent item is to be expanded or collapsed.

The TVM_GETIMAGELIST message is sent to get the handle of the image list that is associated with the tree view control. The index of a particular tree item is sent as a parameter. The TVM_GETITEM message is sent to get information about a specified tree view item. The TVM_GETNEXTITEM message is sent to get the next tree view item based upon a specified code. The code may specify whether to get the currently selected item, the first child item, the item that is a target of a drag-and-drop operation, the first visible item, the next sibling item, the next visible item, the parent of the item, the previous item, the first visible item that precedes a given item or the first child item of the root item.

The TVM_INSERTITEM message is sent to insert a new item into a tree view control. One of the parameters passed in this message or in the macro call is the identification of a structure containing item attributes. The TVM_SELECTITEM message is sent to select a given tree view item, scroll the item into view, and redraw the item. One of the parameters passed in this message or in the macro call is a handle for the tree view item that is to be redrawn. Another of the parameters is a code that identifies the action with regard to a selection should take. A first code sets a selection to the item that is identified by the other parameter. If the item is a child of a collapsed parent item, the parent's list of children is expanded to reveal the item. The code may also indicate that the item is to be redrawn in the style that is used to indicate that it is a target of a drag-and-drop operation. Lastly, the code may indicate that the tree view is to be scrolled vertically so that the item is the first visible item in the portion of the tree that is displayed in the tree view control window.

Figure 11:
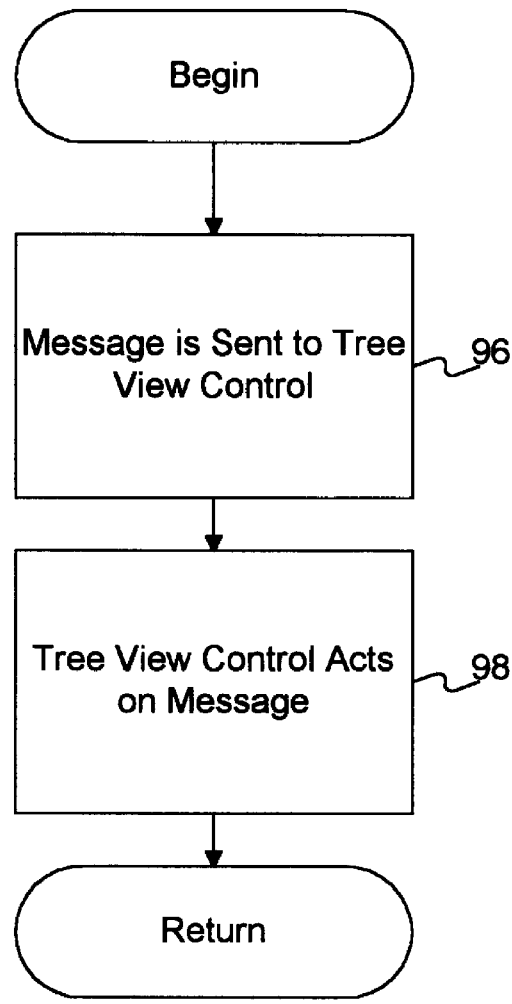
FIG. 11 is a flow chart illustrating the steps that are performed to use tree view messages in accordance with the preferred embodiment of the present invention.

The TVM_SETITEM message is sent to set the attributes of a tree view item. Those skilled in the art will appreciate that other tree view messages may be used to effect the activity of the tree view control. FIG. 11 is a flowchart illustrating the basic steps that are performed when such messages are to be utilized. The parent application sends the message to the tree view control or the corresponding macro is called (step 96). The tree view control then acts on the message or macro call as appropriate (step 98).

Figure 12:
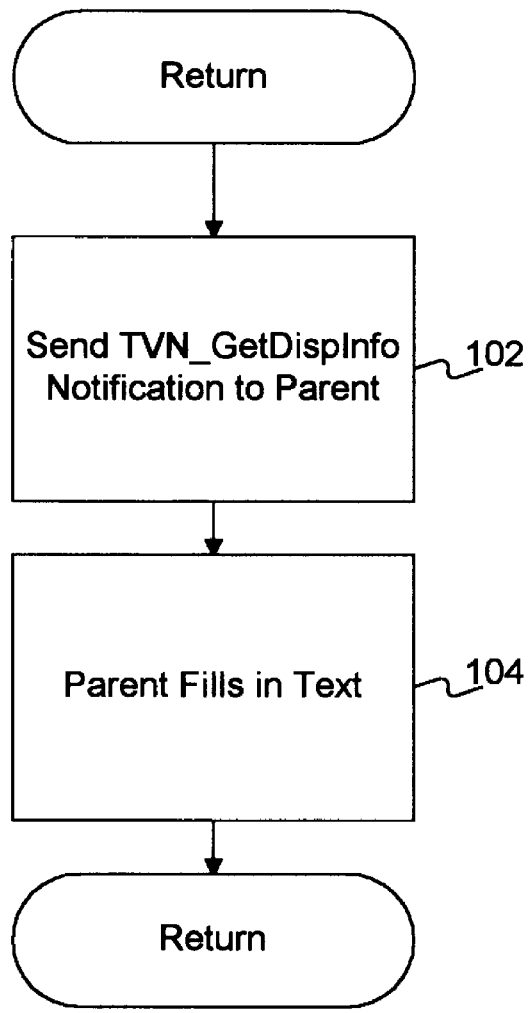
FIG. 12 is a flow chart illustrating the steps that are performed to defer evaluation of an item until needed in accordance with the preferred embodiment of the present invention.

The preferred embodiment of the present invention provides an optimization that may be used to minimize the amount of memory used by a tree view control. In general, a tree view control allocates memory for storing each item in a tree. Since each tree view item may have an associated label, a large amount of memory may be occupied by the storage of the items to be displayed by a tree view control. If an application already has a copy of the strings that are to be used as labels, the preferred embodiment of the present invention provides a vehicle for avoiding the extra memory allocation. FIG. 12 is a flowchart showing the steps that may be performed to avoid the extra memory allocation. Whenever the tree view control needs such text, it sends a TVN_GETDISPINFO notification to the parent window with the address of a TV_DISPINFO data structure (step 102). The TV_DISPINFO data structure holds information that is needed to display an item in the tree view control window. Upon receiving this notification, the parent fills in the text for the label (step 104); thus avoiding the need for allocating extra memory for the label.

While the present invention has been described with reference to a preferred embodiment thereof, those skilled in the art will appreciate that various changes in form or detail may be made without departing from the intended scope of the present invention as defined in the appended claims.

A more detailed technical explanation of a tree view controls is provided in the attached appendix.

16

Tree View Controls

About Tree View Controls

A *tree view control* is a window that displays a hierarchical list of items, such as the headings in a document, the entries in an index, or the files and directories on a disk. Each item consists of a label and an optional bitmapped image, and each item can have a list of subitems associated with it. By clicking an item, the user can expand and collapse the associated list of subitems. The following illustration shows a treeview control that displays a table of contents.

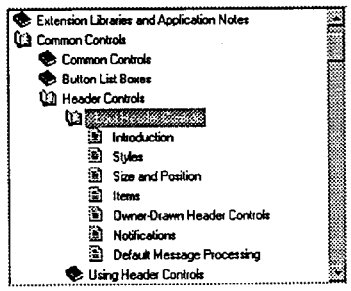

You create a tree view control by using the CreateWindowEx function, specifying the WC_TREEVIEW window class. The class is registered when the common control dynamic-link library (DLL) is loaded. To ensure that this DLL is loaded, include the InitCommonControls function in your application.

After creating a tree view control, you add, remove, arrange, or otherwise manipulate items by sending messages to the tree view. Each message has one or more corresponding macros that you can use instead of sending the message explicitly. The macros are documented with the messages in the Reference section of this chapter.

17

Styles

Tree view controls have a number of styles that govern aspects of the tree view's appearance. You set the initial styles when you create the tree view control. You can retrieve and change the styles after creating the tree view by using the GetWindowLong and SetWindowLong functions.

The TVS_HASLINES style enhances the graphic representation of a tree view control's hierarchy by drawing lines that link child items to their corresponding parent item. This style does not link items at the root of the hierarchy. To do so, you need to combine the TVS_HASLINES and TVS_LINESATROOT, styles.

The user can expand or collapse a parent item's list of child items by double-clicking the parent item. A tree view that has the TVS_HASBUTTONS style adds a button to the left side of each parent item. The user can click the button to expand or collapse the child items as an alternative to double-clicking the parent item.

TVS_HASBUTTONS does not add buttons to items at the root of the hierarchy. To do so, you must combine TVS_HASLINES, TVS_LINESATROOT, and TVS_HASBUTTONS.

The TVS_EDITLABELS style makes it possible for the user to edit the labels of tree view items. For more information about editing labels, see "Label Editing" later in this chapter.

Parent and Child Items

Any item in a tree view control can have a list of subitems, called *child items*, associated with it. An item that has one or more child items is called a *parent item*. A child item is displayed below its parent item and is indented to indicate it is subordinate to the parent. An item that has no parent is at the top of the hierarchy and is called a *root item*.

You add an item to a tree view control by sending the TVM_INSERTITEM message to the control. The message returns a handle of the HTREEITEM type that uniquely identifies the item. When adding an item, you must specify the handle of the new item's parent item. If you specify NULL or TVI_ROOT instead of an item handle, the item is added as a root item.

At any given time, the state of a parent item's list of child items can be either expanded or collapsed. When the state is expanded, the child items are displayed below the parent item. When it is collapsed, the child items are not displayed. The list automatically toggles between the expanded and collapsed states when the user double-clicks the parent item or, if the parent has TVS_HASBUTTONS, when the user clicks the button associated with the parent item. An application can expand or collapse the child items by using the TVM_EXPAND message.

A tree view control sends the parent window a TVN_ITEMEXPANDING notification message when a parent item's list of child items is about to be expanded or collapsed. The notification gives an application the opportunity to prevent the change or to set any attributes of the parent item that depend on the state of the list of child items. After changing the state of the list, the tree view sends the parent window a TVN_ITEMEXPANDED notification message.

18

When a list of child items is expanded, it is indented relative to the parent item. You can set the amount of indentation by using the TVM_SETINDENT message or retrieve the current amount by using the TVM_GETINDENT message.

Item Labels

You typically specify the text of an item's label when adding the item to the tree view control. TVM_INSERTITEM includes a TV_ITEM structure that defines the item's properties, including a string containing the text of the label.

A tree view control allocates memory for storing each item; the text of the item labels takes up a significant portion of this memory. If your application maintains a copy of the strings in the tree view control, you can decrease the memory requirements of the control by specifying the LPSTR_TEXTCALLBACK value instead of passing actual strings to the tree view. Using LPSTR_TEXTCALLBACK causes the tree view to retrieve the text of an item's label from the parent window whenever the item needs to be redrawn. To retrieve the text, the tree view sends a TVN_GETDISPINFO notification message, which includes the address of a TV_DISPINFO structure. The parent window must fill the appropriate members of the structure.

Label Editing

The user can directly edit the labels of items in a tree view control that has the TVS_EDITLABELS style. The user begins editing by clicking the label of the item that has the focus. An application begins editing by using the TVM_EDITLABEL message. The tree view notifies the parent window when editing begins and when it is canceled or completed. When editing is completed, the parent window is responsible for updating the item's label, if appropriate.

When label editing begins, a tree view control sends its parent window a TVN_BEGINLABELEDIT notification message. By processing this notification, an application can allow editing of some labels and prevent editing of others. Returning zero allows editing, and returning nonzero prevents it.

When label editing is canceled or completed, a tree view control sends its parent window a TVN_ENDLABELEDIT notification message. The *lParam* parameter is the address of a TV_DISPINFO structure, which identifies the item and specifies the edited text. The parent window is responsible for updating the item's label, if appropriate, perhaps after validating the edited string. The item member of TV_DISPINFO is –1 if editing is canceled.

During label editing, you can get the handle of the edit control used for label editing by using the TVM_GETEDITCONTROL message. You can send the edit control an EM_LIMITTEXT message to limit the amount of text a user can enter or subclass the edit control to intercept and discard invalid characters. Note, however, that the edit control is created *after* the TVN_BEGINLABELEDIT notification is sent.

Item Position

An item's initial position is set when the item is added to the tree view control using the TVM_INSERTITEM message. The message includes a TV_INSERTSTRUCT

19 structure that specifies the handle of the parent item and the handle of the item after which the new item is to be inserted. The second handle must identify either a child item of the given parent or one of these values: TVI_FIRST, TVI_LAST, or TVI_SORT.

The tree view control places the new item at the beginning or end of the given parent item's list of child items when TVI_FIRST and TVI_LAST are specified. The tree view control inserts the new item into the list of child items in alphabetical order based on the text of the item labels when TVI_SORT is specified.

You can put a parent item's list of child items into alphabetical order by using the TVM_SORTCHILDREN message. The message includes a parameter that specifies whether all levels of child items descending from the given parent item are also put into alphabetical order.

The TVM_SORTCHILDRENCB message allows you to sort child items based on criteria that you define. When you use this message, you specify an application-defined callback function that the tree view control can call whenever the relative order of two child items needs to be decided. The callback function receives two 32-bit application-defined values for the items being compared and a third 32-bit value that you specify when sending TVM_SORTCHILDRENCB.

Item States

An item's current state is specified by the state member of the TV_ITEM structure. A tree view control might change an item's state to reflect a user action, such as selecting the item or setting the focus to the item. In addition, an application might change an item's state to disable or hide the item, or to specify an overlay image or state image.

When you specify or change an item's state, the stateMask member of the TV_ITEM structure specifies which state bits to set, and the state member contains the new values for those bits. To set an item's overlay image, stateMask must include the value TVIS_OVERLAYMASK, and state must include the one-based index of the overlay image shifted left eight bits using the INDEXTOOVERLAYMASK macro. The index can be zero to specify no overlay image. To set an item's state image, stateMask must include the TVIS_STATEIMAGEMASK value, and state must include the one-based index of the state image shifted left twelve bits using the INDEXTOSTATEIMAGEMASK macro. The index can be zero to specify no state image. For more information about overlay and state images, see "Tree View Image Lists" later in this chapter.

Item Selection

A tree view control notifies the parent window when the selection changes from one item to another by sending the TVN_SELCHANGING and TVN_SELCHANGED notification messages. Both notifications include a value that specifies whether the change is the result of a mouse click or a keystroke. The notifications also include information about the item that is gaining the selection and the item that is losing the selection. You can use this information to set item attributes that depend on the selection state of the item.

20

An application can change the selection by sending the TVM_SELECTITEM message.

Item Information

Tree view controls are used with a number of messages that retrieve information about items in the control. TVM_GETITEM retrieves the attributes of an item, including its current state, its selected and nonselected bitmapped images, a count of its child items, a pointer to its label string, and its application-defined 32-bit value. The TVM_GETNEXTITEM message retrieves the tree view item that bears the specified relationship to the current item. The message can retrieve an item's parent, the next or previous visible item, the first child item, and so on.

The TVM_GETITEMRECT message retrieves the bounding rectangle for a tree view item. The TVM_GETCOUNT and TVM_GETVISIBLECOUNT messages retrieve a count of the items in a tree view control and a count of the items that are currently visible in the tree view control's window. You can ensure that a particular item is visible by using the TVM_ENSUREVISIBLE message.

Tree View Image Lists

Each item in a tree view control can have a pair of bitmapped images associated with it. The images appear on the left side of an item's label. One image is displayed when the item is selected, and the other is displayed when the item is not selected. For example, an item might display an open folder when it is selected and a closed folder when it is not selected.

To use item images, you must create an image list by using the ImageList_Create function, add the desired bitmaps to the list, and associate the list with the tree view control by using the TVM_SETIMAGELIST message. By default, all items display the first image in the image list for both the selected and nonselected states. You can change the default behavior for a particular item by specifying the indexes of the selected and nonselected images when adding the item to the tree view using the TVM_INSERTITEM message. You can change the indexes after adding an item by using TVM_SETITEM.

A tree view control's image lists can also contain overlay images, which are designed to be superimposed on item images. A nonzero value in bits 8 through 11 of a tree view item's state specifies the one-based index of an overlay image (zero indicates no overlay image). Because a 4-bit, one-based index is used, overlay images must be among the first 15 images in the image lists. For more information about tree view item states, see "Item States" earlier in this chapter.

If a state image list is specified, a tree view control reserves space to the left of each item's icon for a state image. An application can use state images, such as checked and cleared check boxes, to indicate application-defined item states. A nonzero value in bits 12 through 15 specifies the one-based index of a state image (zero indicates no state image).

By specifying the I_IMAGECALLBACK value instead of the index of an image in the TV_ITEM structure, you can put off specifying the selected or nonselected image until the item is about to be redrawn. I_IMAGECALLBACK directs the tree view to query the parent window for the index by sending the TVN_GETDISPINFO notification message.
The TVM_GETIMAGELIST message retrieves the handle of a tree view control's image list. This message is useful if you need to add more images to the list. For more information about image lists, see Chapter 11, "Image Lists."

Drag-and-Drop Operations

A tree view control notifies the parent window when the user wants to begin dragging an item. The parent window receives a TVN_BEGINDRAG notification message when the user begins dragging an item with the left mouse button and a TVM_BEGINRDRAG notification message when the user begins dragging with the right button. An application can prevent a tree view control from sending these notifications by giving the control the TVS_DISABLEDRAGDROP style.
You obtain an image to display during a dragging operation by using the TVM_CREATEDRAGIMAGE message. The tree view control creates a dragging bitmap based on the label of the item being dragged. Then the tree view creates an image list, adds the bitmap to it, and returns the handle of the image list.
You must provide the code that actually drags the item. This typically involves using the dragging capabilities of the image list functions and processing the WM_MOUSEMOVE and WM_LBUTTONUP (or WM_RBUTTONUP) messages sent to the parent window after the drag operation has begun. For more information about the image list functions, see Chapter 11, "Image Lists."
If items in a tree view control are to be the targets of a drag-and-drop operation, you need to know when the mouse cursor is on a target item. You can find out by using the TVM_HITTEST message. You specify the address of a TV_HITTESTINFO structure that contains the current coordinates of the mouse cursor. When the SendMessage function returns, the structure contains a flag indicating the location of the mouse cursor relative to the tree view control. If the cursor is over an item in the tree view control, the structure contains the handle of the item as well.
You can indicate that an item is the target of a drag-and-drop operation by using the TVM_SETITEM message to set the state to the TVIS_DROPHILITED value. An item that has this state is drawn in the style used to indicate a drag-and-drop target.

Tree View Control Notification Messages

A tree view control sends the following notification messages to its parent window in the form of WM_NOTIFY messages.

| Notification | Description |
|---|---|
| TVN_BEGINDRAG | Signals the start of a drag-and-drop operation. |
| TVN_BEGINLABELEDIT | Signals the start of in-place label editing. |
| TVN_BEGINRDRAG | Signals the start of a drag-and-drop operation, using the right mouse button. |
| TVN_DELETEITEM | Signals the deletion of a specific item. |
| TVN_ENDLABELEDIT | Signals the end of label editing. |

| | |
|---|---|
| TVN_GETDISPINFO | Requests information that the tree view control requires to display an item. |
| TVN_ITEMEXPANDED | Signals that a parent item's list of child items was expanded or collapsed. |
| TVN_ITEMEXPANDING | Signals that a parent item's list of child items is about to be expanded or collapsed. |
| TVN_KEYDOWN | Signals a keyboard event. |
| TVN_SELCHANGED | Signals that the selection has changed from one item to another. |
| TVN_SELCHANGING | Signals that the selection is about to be changed from one item to another. |
| TVN_SETDISPINFO | Notifies a parent window that it must update the information it maintains for an item. |

Default Message Processing

The following table summarizes the message processing performed by a tree view control. Because messages specific to tree view controls are discussed elsewhere, they are not included here.

| Message | Processing performed |
|---|---|
| WM_COMMAND | Processes the EN_UPDATE and EN_KILLFOCUS edit control notification messages and forwards all other edit control notifications to the parent window. No return value. |
| WM_CREATE | Allocates memory and initializes internal data structures. It returns zero if successful or −1 otherwise. |
| WM_DESTROY | Frees all system resources associated with the control. It returns zero. |
| WM_ENABLE | Enables or disables the control. |
| WM_ERASEBKGND | Erases the window background using the current background color for the tree view. It returns TRUE. |
| WM_GETDLGCODE | Returns a combination of the DLGC_WANTARROWS and DLGC_WANTCHARS values. |
| WM_GETFONT | Returns the handle of the current label font. |
| WM_HSCROLL, WM_VSCROLL | Scrolls the tree view. It returns TRUE if scrolling occurs or FALSE otherwise. |

23

| | |
|---|---|
| WM_KEYDOWN | Sends the NM_RETURN notification message when the user presses the ENTER key. It moves the caret when the user presses the direction keys or the PAGE UP, PAGE DOWN, HOME, END, or BACKSPACE key. It scrolls the control when the user presses the CTRL key in combination with those keys. It sends the TVN_KEYDOWN notification message to the parent window. It returns TRUE if a key is processed or FALSE otherwise. |
| WM_KILLFOCUS | Repaints the focused item, if any, and sends an NM_KILLFOCUS notification message to the parent window. |
| WM_LBUTTONDBLCLK | Cancels label editing and, if an item was double-clicked, sends the NM_DBLCLK or NM_RDBLCLK notification message to the parent window. If the parent window returns TRUE, the control toggles the expanded state of the item, sending the parent window the TVN_ITEMEXPANDING and TVN_ITEMEXPANDED notification messages. There is no return value. |
| WM_LBUTTONDOWN | Toggles the expanded state if the user clicked the button associated with a parent item. If the user clicked an item label, the control selects and sets the focus to the item. If the user moves the mouse before releasing the mouse button, the control begins a drag-and-drop operation. There is no return value. |
| WM_PAINT | Paints the invalid region of the control. It returns zero. |
| WM_RBUTTONDOWN | Checks to see if an item was clicked and a drag operation was begun. If the operation has begun, it sends a TVN_BEGINRDRAG notification message to the parent window and highlights the drop target. Otherwise, it sends an NM_RCLICK notification message to the parent window. There is no return value. |
| WM_SETFOCUS | Repaints the focused item, if any, and sends an NM_SETFOCUS notification message to the parent window. |
| WM_SETFONT | Saves the specified font handle and repaints the control using the new font. |
| WM_SETREDRAW | Sets or clears the redraw flag. The control is redrawn after the redraw flag is set. It returns zero. |

| | |
|---|---|
| WM_SIZE | Recomputes internal variables that depend on the size of the control's client area. It returns TRUE. |
| WM_STYLECHANGED | Cancels label editing and redraws the control using the new styles. It returns zero. |
| WM_SYSCOLORCHANGE | Redraws the control using the new color if the redraw flag is set. There is no return value. |
| WM_TIMER | Begins editing an item label. If the user clicks the label of the focused item, the control sets a timer instead of entering edit mode immediately. The timer makes it possible to avoid entering edit mode if the user double-clicks the label. It returns zero. |

Using Tree View Controls

This section contains examples demonstrating how to perform the following tasks:
- Create a tree view control.
- Associate an image list with the control.
- Add items to the control.
- Drag a tree view item.

Creating a Tree View Control

To create a tree view control, use the CreateWindow or CreateWindowEx function, specifying the WC_TREEVIEW value for the window class. The tree view window class is registered in the application's address space when the common control dynamic-link library (DLL) is loaded. To ensure that the DLL is loaded use the InitCommonControls function.

The following example creates a tree view control that is sized to fit the client area of the parent window. It also uses application-defined functions to associate an image list with the control and add items to the control.

```
// CreateATreeView - creates a tree view control.
// Returns the handle of the new control if successful or NULL
//    otherwise.
// hwndParent - handle of the control's parent window
// lpszFileName - name of the file to parse for tree view items HWND CreateATreeView(HWND hwndParent, LPSTR lpszFileName)
{
    RECT rcClient;  // dimensions of client area
    HWND hwndTV;    // handle of tree view control // Ensure that the common control DLL is loaded.
    InitCommonControls();
```

```
        // Get the dimensions of the parent window's client area and create
        // the tree view control.
        GetClientRect(hwndParent, &rcClient);
        hwndTV = CreateWindowEx(0, WC_TREEVIEW, "Tree View",
            WS_VISIBLE | WS_CHILD | WS_BORDER | TVS_HASLINES,
            0, 0, rcClient.right, rcClient.bottom,
            hwndParent, (HMENU) ID_TREEVIEW, g_hinst, NULL);

// Initialize the image list and add items to the control.
        // InitTreeViewImageLists and InitTreeViewItems are application-
        // defined functions.
        if (!InitTreeViewImageLists(hwndTV) ||
                !InitTreeViewItems(hwndTV, lpszFileName)) {
            DestroyWindow(hwndTV);
            return FALSE;
        }
        return hwndTV;
}
```

Initializing the Image List

Every item in a tree view control can have two images associated with it. An item displays one image when it is selected and the other when it is not. To include images with tree view items, you must use the image list functions to create an image list and add images to it. Then you must associate the image list with the tree view control by using the TVM_SETIMAGELIST message.

The following example creates an image list, adds three bitmaps to the list, and associates the image list with a tree view control.

```
// InitTreeViewImageLists - creates an image list, adds three bitmaps to
//     it, and associates the image list with the tree view control.
// Returns TRUE if successful or FALSE otherwise.
// hwndTV - handle of the tree view control
//
// Global variables and constants
//      g_nOpen, g_nClosed, and g_nDocument - integer variables for
//          indexes of the images
//      CX_BITMAP and CY_BITMAP - width and height of an icon
//      NUM_BITMAPS - number of bitmaps to add to the image list BOOL InitTreeViewImageLists(HWND hwndTV)
{
    HIMAGELIST himl;    // handle of image list
    HBITMAP hbmp;       // handle of bitmap // Create the image list.
    if ((himl = ImageList_Create(CX_BITMAP, CY_BITMAP,
            FALSE, NUM_BITMAPS, 0)) == NULL)
```

```
       return FALSE;

// Add the open file, closed file, and document bitmaps.
    hbmp = LoadBitmap(g_hinst, MAKEINTRESOURCE(IDB_OPEN_FILE));
    g_nOpen = ImageList_Add(himl, hbmp, (HBITMAP) NULL);

hbmp = LoadBitmap(g_hinst, MAKEINTRESOURCE(IDB_CLOSED_FILE));
    g_nClosed = ImageList_Add(himl, hbmp, (HBITMAP) NULL);

hbmp = LoadBitmap(g_hinst, MAKEINTRESOURCE(IDB_DOCUMENT));
    g_nDocument = ImageList_Add(himl, hbmp, (HBITMAP) NULL);

// Fail if not all of the images were added.
    if (ImageList_GetImageCount(himl) < 3)
        return FALSE;

// Associate the image list with the tree view control.
    TreeView_SetImageList(hwndTV, himl, TVSIL_NORMAL);

return TRUE;
}
```

Adding Tree View Items

You add an item to a tree view control by sending the TVM_INSERTITEM message to the control. The message includes a pointer to a TV_INSERTSTRUCT structure that specifies the parent item, the item after which the new item is inserted, and a TV_ITEM structure that defines the attributes of the item. The attributes include the item's label, its selected and nonselected images, and a 32-bit application-defined value.

The example in this section creates a table of contents based on the information in a text file. The example includes two functions. The first function searches a file for headings. When it finds one, it extracts the text of the heading and the value that indicates the level of the heading and passes them to the second function. Headings are assumed to be in the following form, .*[heading].n*, where *heading* is the text of the heading and *n* indicates the heading level. The example ignores heading levels greater than level four.

The second function adds an item to a tree view control, using the heading text as the item's label and the heading level to determine the parent item for the new item. A level one heading is added to the root of the tree view control, a level two heading is added as a child item of the previous level one item, and so on. The function assigns an image to an item based on whether it has any child items. If an item has child items, it gets an image representing a closed folder. Otherwise, it gets an image representing a document. An item uses the same image for both the selected and nonselected states.

```
// InitTreeViewItems - extracts headings from the specified file and
//     passes them to a function that adds them to a tree view control.
```

```
// Returns TRUE if successful or FALSE otherwise.
// hwndTV - handle of the tree view control
// lpszFileName - name of file with headings BOOL InitTreeViewItems(HWND hwndTV, LPSTR lpszFileName)
{
    HANDLE hf;              // handle of file
    DWORD cbRead;           // number of bytes read
    char szItemText[128];   // label text of tree view item
    int nLevel;             // heading level
    LPCH pch;               // pointer to data read from file
    LPCH pchTmp;            // temporary pointer
    DWORD i, j;             // counters // Open the file to parse.
    if ((hf = CreateFile(lpszFileName, GENERIC_READ,
            FILE_SHARE_READ, (LPSECURITY_ATTRIBUTES) NULL,
            OPEN_EXISTING, FILE_ATTRIBUTE_NORMAL,
            (HANDLE) NULL)) == (HANDLE) INVALID_HANDLE_VALUE)
        return FALSE;

// Parse the file looking for headings.
    pch = (LPCH) LocalAlloc(LPTR, sizeof(char) * 2048);
    pchTmp = pch;
    do {
        // Read a chunk of the file.
        ReadFile(hf, pchTmp, sizeof(char) * 2048, &cbRead,
            (LPOVERLAPPED) NULL);
        // Parse the chunk looking for ".[".
        for (i = 0, j = 0; i < cbRead; i++) {
            if ((i + 2) > cbRead)    // break if end of chunk
                break;

// Extract the heading text from between the brackets.
            if ((*pchTmp == '.') && (*(pchTmp+1) == '[')) {
                pchTmp = pchTmp + 2;
                i += 2;
                while (*pchTmp != ']' && ((i++) <= cbRead) )
                    szItemText[j++] = *pchTmp++;
                szItemText[j] = '\0';
                j = 0;
                nLevel = atoi(pchTmp + 2);

// Add the item to the tree view control.
                AddItemToTree(hwndTV, (LPSTR) &szItemText, nLevel);
            } else
                ++pchTmp;
        }
        pchTmp = pch;
    } while (cbRead != 0);
```

28

```
    CloseHandle((HANDLE) hf);

return TRUE;
}

// AddItemToTree - adds items to a tree view control.
// Returns the handle of the newly added item.
// hwndTV - handle of the tree view control
// lpszItem - text of the item to add
// nLevel - level at which to add the item HTREEITEM AddItemToTree(HWND hwndTV, LPSTR lpszItem, int nLevel)
{
    TV_ITEM tvi;
    TV_INSERTSTRUCT tvins;
    static HTREEITEM hPrev = (HTREEITEM) TVI_FIRST;
    static HTREEITEM hPrevRootItem = NULL;
    static HTREEITEM hPrevLev2Item = NULL;
    HTREEITEM hti;

tvi.mask = TVIF_TEXT | TVIF_IMAGE
        | TVIF_SELECTEDIMAGE | TVIF_PARAM;

// Set the text of the item.
    tvi.pszText = lpszItem;
    tvi.cchTextMax = lstrlen(lpszItem);

// Assume the item is not a parent item, so give it a
    // document image.
    tvi.iImage = g_nDocument;
    tvi.iSelectedImage = g_nDocument;

// Save the heading level in the item's application-defined
    // data area.
    tvi.lParam = (LPARAM) nLevel;

tvins.item = tvi;
    tvins.hInsertAfter = hPrev;

// Set the parent item based on the specified level.
    if (nLevel == 1)
        tvins.hParent = TVI_ROOT;
    else if (nLevel == 2)
        tvins.hParent = hPrevRootItem;
    else
        tvins.hParent = hPrevLev2Item;

// Add the item to the tree view control.
    hPrev = (HTREEITEM) SendMessage(hwndTV, TVM_INSERTITEM, 0,
        (LPARAM) (LPTV_INSERTSTRUCT) &tvins);
```

```
        // Save the handle of the item.
        if (nLevel == 1)
            hPrevRootItem = hPrev;
        else if (nLevel == 2)
            hPrevLev2Item = hPrev;

// The new item is a child item. Give the parent item a
        // closed folder bitmap to indicate it now has child items.
        if (nLevel > 1) {
            hti = TreeView_GetParent(hwndTV, hPrev);
            tvi.mask = TVIF_IMAGE | TVIF_SELECTEDIMAGE;
            tvi.hItem = hti;
            tvi.iImage = g_nClosed;
            tvi.iSelectedImage = g_nClosed;
            TreeView_SetItem(hwndTV, &tvi);
        } return hPrev;
}
```

Dragging a Tree View Item

Dragging a tree view item typically involves processing the TVN_BEGINDRAG (or TVN_BEGINRDRAG) notification message, the WM_MOUSEMOVE message, and the WM_LBUTTONUP (or WM_RBUTTONUP) message. It also involves using the image list functions to draw the item as it is being dragged. For more information about image lists, see Chapter 11, "Image Lists."

The remainder of this section provides an example that demonstrates how to drag a tree view item. The example consists of three functions. The first function begins the dragging operation, the second drags the image, and the third ends the dragging operation.

Beginning the Drag Operation

A tree view control sends the parent window a TVN_BEGINDRAG (or TVN_BEGINRDRAG) notification message whenever the user starts dragging an item. The parent window receives the notification in the form of a WM_NOTIFY message whose *lParam* parameter is the address of an NM_TREEVIEW structure. The members of this structure include the screen coordinates of the mouse cursor and a TV_ITEM structure that contains information about the item to be dragged.

The following example shows how to process the WM_NOTIFY message to obtain TVN_BEGINDRAG.

```
case WM_NOTIFY:
    switch (((LPNMHDR) lParam)->code) {
        case TVN_BEGINDRAG:
            Main_OnBeginDrag(hwndTV,     // application-defined function
                (NM_TREEVIEW *) lParam);
```

30

```
        break;
    .
    .   // Handle other notifications here.
    .
    }
    break;
```

Beginning the drag operation involves using the ImageList_StartDrag function. The function's parameters include the handle of the image list containing the image to use during the drag operation and the index of the image. You can either provide your own image list and image, or you can have the tree view control create them for you by using the TVM_CREATEDRAGIMAGE message.

Because the drag image replaces the mouse cursor for the duration of the drag operation ImageList_StartDrag requires you to specify a hot spot within the image. The coordinates of the hot spot are relative to the upper left corner of the image. ImageList_StartDrag also requires you to specify the initial location of the drag image. An application typically sets the initial location so that the hot spot of the drag image corresponds to that of the mouse cursor at the time the user began the drag operation.

The following function demonstrates how to start dragging a tree view item. It uses the drag image provided by the tree view control and obtains the bounding rectangle of the item to determine the appropriate point for the hot spot. (The dimensions of the bounding rectangle are the same as those of the image.) Note that the bounding rectangle does not account for the indentation of child items. For this reason, the function adds the amount of indentation to the x-coordinate of the hot spot.

The function captures mouse input, causing mouse messages to be sent to the parent window. The parent window needs the subsequent WM_MOUSEMOVE messages to determine where to drag the image and the WM_LBUTTONUP message to determine when to end the drag operation.

```
// Main_OnBeginDrag - begins dragging an item in a tree view control.
// hwndTV - handle of the image list
// lpnmtv - address of information about the item being dragged void Main_OnBeginDrag(HWND hwndTV, NM_TREEVIEW *lpnmtv)
{
    HIMAGELIST himl;      // handle of image list
    RECT rcItem;          // bounding rectangle of item
    DWORD dwLevel;        // heading level of item
    DWORD dwIndent;       // amount that child items are indented // Tell the tree view to create an image to use for dragging.
    himl = TreeView_CreateDragImage(hwndTV, lpnmtv->itemNew.hItem);

// Get the bounding rectangle of the item being dragged.
    TreeView_GetItemRect(hwndTV, lpnmtv->itemNew.hItem, &rcItem, TRUE);

// Get the heading level and the amount that the child items are
    // indented.
```

```
    dwLevel = lpnmtv->itemNew.lParam;
    dwIndent = (DWORD) SendMessage(hwndTV, TVM_GETINDENT, 0, 0);

// Start the drag operation.
    ImageList_StartDrag(himl, hwndTV, 0,
        lpnmtv->ptDrag.x,
        lpnmtv->ptDrag.y,
        lpnmtv->ptDrag.x - ((dwLevel - 1) * dwIndent),
        lpnmtv->ptDrag.y - rcItem.top);

// Hide the mouse cursor and direct mouse input to the
    // parent window.
    ShowCursor(FALSE);
    SetCapture(GetParent(hwndTV));
    g_fDragging = TRUE;
    return;
}
```

Dragging the Tree View Item

You drag a tree view item by calling the ImageList_DragMove function when the parent window receives a WM_MOUSEMOVE message, as the following example shows. The example also performs hit testing during the drag operation to determine whether to highlight other items in the tree view as targets of a drag-and-drop operation.

```
// Main_OnMouseMove - drags an item in a tree view control,
//     highlighting the item that is the target.
// hwndParent - handle of the parent window
// hwndTV - handle of the tree view control
// xCur and yCur - x - and y - coordinates of the mouse cursor void Main_OnMouseMove(HWND hwndParent, HWND hwndTV, LONG xCur, LONG yCur)
{
    HTREEITEM htiTarget;    // handle of target item
    TV_HITTESTINFO tvht;    // hit test information if (g_fDragging) {

// Drag the item to the current position of the mouse cursor.
        ImageList_DragMove(xCur, yCur);

// Find out if the cursor is on the item. If it is, highlight
        // the item as a drop target.
        tvht.pt.x = xCur;
        tvht.pt.y = yCur;
        if ((htiTarget = TreeView_HitTest(hwndTV, &tvht)) != NULL) {
            TreeView_SelectDropTarget(hwndTV, htiTarget);
        }
```

32

```
    }
    return;
}
```

Ending the Drag Operation

The follow example ends a dragging operation. The ImageList_EndDrag function is called when the parent window receives a WM_LBUTTONUP message.

```
// Main_OnLButtonUp - stops dragging a tree view item, releases the
//    mouse capture, and shows the mouse cursor.
//
// Global variable
//    g_fDragging - indicates whether a dragging operation is underway.

void Main_OnLButtonUp(void)
{
    if (g_fDragging) {
        ImageList_EndDrag();
        ReleaseCapture();
        ShowCursor(TRUE);
        g_fDragging = FALSE;
    }
    return;
}
```

Reference

This section describes the messages, macros, notification messages, and structures associated with tree view controls. These elements can be grouped as follows.

Item Labels
TV_DISPINFO
TV_ITEM
TVM_INSERTITEM
TVN_GETDISPINFO

Label Editing
TV_DISPINFO
TVM_GETEDITCONTROL
TVM_EDITLABEL
TVN_BEGINLABELEDIT
TVN_ENDLABELEDIT

Item States
TVM_GETITEM
TVM_SELECTITEM
TVM_SETITEM

TVN_SELCHANGED
TVN_SELCHANGING

Tree View Image Lists
TVM_GETIMAGELIST
TVM_INSERTITEM
TVM_SETIMAGELIST
TVM_SETITEM
TVN_GETDISPINFO

Item Position
TV_INSERTSTRUCT
TVM_INSERTITEM
TVM_SORTCHILDREN
TVM_SORTCHILDRENCB

Parent and Child Items
TVM_EXPAND
TVM_GETINDENT

TVM_SETINDENT
TVN_ITEMEXPANDING
TVN_ITEMEXPANDED
Item Information
TVM_ENSUREVISIBLE
TVM_GETCOUNT
TVM_GETITEM
TVM_GETNEXTITEM
TVM_GETVISIBLECOUNT
Drag-and-Drop Operations
TV_HITTESTINFO
TVM_CREATEDRAGIMAGE
TVM_HITTEST TVM_SETITEM
TVN_BEGINDRAG
TVN_BEGINRDRAG
Miscellaneous
NM_TREEVIEW
TV_KEYDOWN
TV_SORTCB
TVM_DELETEITEM
TVM_GETITEMRECT
TVN_DELETEITEM
TVN_KEYDOWN
TVN_SETDISPINFO

Messages

An application sends messages to add items and to alter the appearance and behavior of a tree view control. Each message has a corresponding macro, which you can use instead of sending the message explicitly. Some messages may have related macros which are a more specialized form of a corresponding macro.

TVM_CREATEDRAGIMAGE

```
TVM_CREATEDRAGIMAGE
wParam = 0;
lParam = (LPARAM) (HTREEITEM) hitem;

// Corresponding macro
HIMAGELIST TreeView_CreateDragImage(hwnd, hitem);
```

Creates a dragging bitmap for the given item in a tree view control, creates an image list for the bitmap, and adds the bitmap to the image list. An application can display the image when dragging the item by using the image list functions. You can send this message explicitly or by using the TreeView_CreateDragImage macro.
- Returns the handle of the image list to which the dragging bitmap was added if successful or NULL otherwise.

*hwnd* and *hitem*
Handle of the tree view control, and the handle of the item that receives the new dragging bitmap.

TVM_DELETEITEM

```
TVM_DELETEITEM
wParam = 0;
lParam = (LPARAM) (HTREEITEM) hitem;
```

34

```
// Corresponding macro
BOOL TreeView_DeleteItem(hwnd, hitem);

// Related macro
BOOL TreeView_DeleteAllItems(hwnd);
```

Removes an item from a tree view control. You can send this message explicitly or by using the TreeView_DeleteItem or TreeView_DeleteAllItems macro.
- Returns TRUE if successful or FALSE otherwise.

*hwnd* and *hitem*
    Handle of the tree view control, and the handle of the item to delete. If *hitem* is the TVI_ROOT value, all items are deleted from the tree view control.

If the item label is being edited, the edit operation is canceled and the parent window receives the TVN_ENDLABELEDIT notification message. The parent window receives a TVN_DELETEITEM notification message when the item is removed.

TVM_EDITLABEL

```
TVM_EDITLABEL
wParam = 0;
lParam = (LPARAM) (HTREEITEM) hitem;

// Corresponding macro
HWND TreeView_EditLabel(hwnd, hitem);
```

Begins in-place editing of the specified item's text, replacing the text of the item with a single-line edit control containing the text. This message implicitly selects and focuses the specified item. You can send this message explicitly or by using the TreeView_EditLabel macro.
- Returns the handle of the edit control used to edit the item text, if successful or NULL otherwise.

*hwnd* and *hitem*
    Handle of the tree view control, and the handle of the item to edit.

This message sends a TVN_BEGINLABELEDIT notification message to the parent of the tree view control.
When the user completes or cancels editing, the edit control is destroyed and the handle is no longer valid. You can safely subclass the edit control, but do not destroy it.

TVM_ENSUREVISIBLE

35

```
TVM_ENSUREVISIBLE
wParam = 0;
lParam = (LPARAM) (HTREEITEM) hitem;

// Corresponding macro
BOOL TreeView_EnsureVisible(hwnd, hitem);
```

Ensures that a tree view item is visible, expanding the parent item or scrolling the tree view control if necessary. You can send this message explicitly or by using the TreeView_EnsureVisible macro.
- Returns TRUE if successful or FALSE otherwise.

*hwnd* and *hitem*
    Handle of the tree view control, and the handle of the item.

If the message expands the parent item, the parent window receives the TVN_ITEMEXPANDING and TVN_ITEMEXPANDED notification messages.

TVM_EXPAND

```
TVM_EXPAND
wParam = (WPARAM) (UINT) flag;
lParam = (LPARAM) (HTREEITEM) hitem;

// Corresponding macro
BOOL TreeView_Expand(hwnd, hitem, flag);
```

Expands or collapses the list of child items, if any, associated with the given parent item. You can send this message explicitly or by using the TreeView_Expand macro.
- Returns TRUE if any change took place or FALSE otherwise.

*hwnd* and *hitem*
    Handle of the tree view control, and the handle of the parent item to expand or collapse.

*flag*
    Action flag. It can be one of these values:

| | |
|---|---|
| TVE_COLLAPSE | Collapses the list. |
| TVE_COLLAPSERESET | Collapses the list and removes the child items. |
| TVE_EXPAND | Expands the list. |
| TVE_TOGGLE | Collapses the list if it is currently expanded or expands it if it is currently collapsed. |

This message sends the TVN_ITEMEXPANDING and TVN_ITEMEXPANDED notification messages to the parent window.

36

TVM_GETCOUNT

```
TVM_GETCOUNT
wParam = 0;
lParam = 0;

// Corresponding macro
UINT TreeView_GetCount(hwnd);
```

Retrieves a count of the items in a tree view control. You can send this message explicitly or by using the TreeView_GetCount macro.
- Returns the count of items.

*hwnd*
    Handle of the tree view control.

TVM_GETEDITCONTROL

```
TVM_GETEDITCONTROL
wParam = 0;
lParam = 0;

// Corresponding macro
HWND TreeView_GetEditControl(hwnd);
```

Retrieves the handle of the edit control being used to edit a tree view item's text. You can send this message explicitly or by using the TreeView_GetEditControl macro.
- Returns the handle of the edit control if successful or NULL otherwise.

*hwnd*
    Handle of the tree view control.

TVM_GETIMAGELIST

```
TVM_GETIMAGELIST
wParam = (WPARAM) iImage;
lParam = 0;

// Corresponding macro
HIMAGELIST TreeView_GetImageList(hwnd, iImage);
```

Retrieves the handle of the normal or state image list associated with a tree view control. You can send this message explicitly or by using the TreeView_GetImageList macro.
- Returns the handle of the image list.

37

*hwnd*
    Handle of the image list.

*iImage*
    Type of image list to retrieve. It can be one of these values:

| | |
|---|---|
| TVSIL_NORMAL | Retrieves the normal image list, which contains the selected and nonselected images for the tree view item. |
| TVSIL_STATE | Retrieves the state image list, which contains the images for tree view items that are in a user-defined state. |

TVM_GETINDENT

```
TV_GETINDENT
wParam = 0;
lParam = 0;

// Corresponding macro
UINT TreeView_GetIndent(hwnd);
```

Retrieves the amount, in pixels, that child items are indented relative to their parent items. You can send this message explicitly or by using the TreeView_GetIndent macro.
- Returns the amount of indentation.

*hwnd*
    Handle of the tree view control.

TVM_GETITEM

```
TVM_GETITEM
wParam = 0;
lParam = (LPARAM) (TV_ITEM FAR*) pitem;

// Corresponding macro
BOOL TreeView_GetItem(hwnd, pitem);
```

Retrieves some or all of a tree view item's attributes. You can send this message explicitly or by using the TreeView_GetItem macro.
- Returns TRUE if successful or FALSE otherwise.

*hwnd*
    Handle of the tree view control.

*pitem*
    Address of a TV_ITEM structure that specifies the information to retrieve and receives information about the item. When the message is sent, the hItem

38 member identifies the item to retrieve information about and the mask member specifies the attributes to retrieve.

If mask specifies the TVIF_TEXT value, the pszText member must contain the address of the buffer that receives the item text and the cchTextMax member must specify the size of the buffer.

If mask specifies the TVIF_STATE value, the stateMask member specifies which item states are to be returned.

TVM_GETITEMRECT

```
TVM_GETITEMRECT
wParam = (WPARAM) (BOOL) fItemRect;
lParam = (LPARAM) (RECT FAR*) prc;

// Corresponding macro
BOOL TreeView_GetItemRect(hwnd, hitem, prc, fItemRect);
```

Retrieves the bounding rectangle for a tree view item and indicates whether the item is visible. You can send this message explicitly or by using the TreeView_GetItemRect macro.
- Returns TRUE if the item is visible, and retrieves the bounding rectangle. Otherwise, it returns FALSE and does not retrieve the bounding rectangle.

*hwnd* and *hitem*
Handle of the tree view control, and the handle of the item.

*prc*
Address of a RECT structure that receives the bounding rectangle. The coordinates are relative to the upper left corner of the tree view control.

*fItemRect*
Value specifying the portion of the item for which to retrieve the bounding rectangle. If this parameter is TRUE, the bounding rectangle includes only the text of the item. Otherwise, it includes the entire line that the item occupies in the tree view control.

TVM_GETNEXTITEM

```
TVM_GETNEXTITEM
wParam = (WPARAM) (UINT) flag;
lParam = (LPARAM) (HTREEITEM) hitem;

// Corresponding macro
HTREEITEM TreeView_GetNextItem(hwnd, hitem, flag);

// Related macros
HTREEITEM TreeView_GetChild(hwnd, hitem);
```

39

```
HTREEITEM TreeView_GetDropHilite(hwnd);
HTREEITEM TreeView_GetFirstVisible(hwnd);
HTREEITEM TreeView_GetNextSibling(hwnd, hitem);
HTREEITEM TreeView_GetNextVisible(hwnd, hitem);
HTREEITEM TreeView_GetParent(hwnd, hitem);
HTREEITEM TreeView_GetPrevSibling(hwnd, hitem);
HTREEITEM TreeView_GetPrevVisible(hwnd, hitem);
HTREEITEM TreeView_GetRoot(hwnd);
HTREEITEM TreeView_GetSelection(hwnd);
```

Retrieves the tree view item that bears the specified relationship to a specified item. You can send this message explicitly or by using the TreeView_GetNextItem macro or one of the related macros.
- Returns the handle of the item if successful or NULL otherwise.

*hwnd* and *hitem*
    Handle of the tree view control, and the handle of an item.

*flag*
    Flag specifying the item to retrieve. It can be one of these values:

| | |
|---|---|
| TVGN_CARET | Retrieves the currently selected item. |
| TVGN_CHILD | Retrieves the first child item. The *hitem* parameter must be NULL. |
| TVGN_DROPHILITE | Retrieves the item that is the target of a drag-and-drop operation. |
| TVGN_FIRSTVISIBLE | Retrieves the first visible item. |
| TVGN_NEXT | Retrieves the next sibling item. |
| TVGN_NEXTVISIBLE | Retrieves the next visible item that follows the specified item. |
| TVGN_PARENT | Retrieves the parent of the specified item. |
| TVGN_PREVIOUS | Retrieves the previous sibling item. |
| TVGN_PREVIOUSVISIBLE | Retrieves the first visible item that precedes the specified item. |
| TVGN_ROOT | Retrieves the first child item of the root item of which the specified item is a part. |

TVM_GETVISIBLECOUNT

```
TVM_GETVISIBLECOUNT
wParam = 0;
lParam = 0;

// Corresponding macro
UINT TreeView_GetVisibleCount(hwnd);
```

40

Retrieves the count of items that fit in the client window of a tree view control. You can send this message explicitly or by using the TreeView_GetVisibleCount macro.
* Returns the count of items.

*hwnd*
    Handle of the tree view control.

TVM_HITTEST

```
TV_HITTEST
wParam = 0;
lParam = (LPARAM) (LPTV_HITTESTINFO) lpht;

// Corresponding macro
HTREEITEM TreeView_HitTest(hwnd, lpht);
```

Determines the location of the specified point relative to the client area of a tree view control. You can send this message explicitly or by using the TreeView_HitTest macro.
* Returns the handle of the tree view item that occupies the specified point or NULL if no item occupies the point.

*hwnd*
    Handle of the tree view control.

*lpht*
    Address of a TV_HITTESTINFO structure. When the message is sent, the pt member specifies the coordinates of the point to test. When the message returns, the hItem member is the handle of the item at the specified point or NULL if no item occupies the point. Also, when the message returns, the flags member is a hit test value that indicates the location of the specified point. For a list of hit test values, see the description of the TV_HITTESTINFO structure.

TVM_INSERTITEM

```
TVM_INSERTITEM
wParam = 0;
lParam = (LPARAM) (LPTV_INSERTSTRUCT) lpis;

// Corresponding macro
HTREEITEM TreeView_InsertItem(hwnd, lpis);
```

Inserts a new item in a tree view control. You can send this message explicitly or by using the TreeView_InsertItem macro.
* Returns the handle of the new item if successful or NULL otherwise.

41

*hwnd*
    Handle of the tree view control.

*lpis*
    Address of a TV_INSERTSTRUCT structure that specifies the attributes of the tree view item.

If the item label is being edited, the edit operation is canceled and the parent window receives the TVN_ENDLABELEDIT notification message.

TVM_SELECTITEM

```
TV_SELECTITEM
wParam = (WPARAM) flag;
lParam = (LPARAM) (HTREEITEM) hitem;

// Corresponding macro
BOOL TreeView_Select(hwnd, hitem, flag);

// Related macros
BOOL TreeView_SelectDropTarget(hwnd, hitem);
BOOL TreeView_SelectItem(hwnd, hitem);
```

Selects the given tree view item, scrolls the item into view, or redraws the item in the style used to indicate the target of a drag-and-drop operation. You can send this message explicitly or by using the TreeView_Select, TreeView_SelectItem, or TreeView_SelectDropTarget macro.

- Returns TRUE if successful or FALSE otherwise.

*hwnd* and *hitem*
    Handle of the tree view control, and the handle of an item.

*flag*
    Action flag. It can be one of these values:

| | |
|---|---|
| TVGN_CARET | Sets the selection to the given item. |
| TVGN_DROPHILITE | Redraws the given item in the style used to indicate the target of a drag-and-drop operation. |
| TVGN_FIRSTVISIBLE | Scrolls the tree view vertically such that the given item is the first visible item. |

If the TVGN_CARET value is specified, the parent window receives the TVN_SELCHANGING and TVN_SELCHANGED notification messages. Also, if the specified item is the child of a collapsed parent item, the parent's list of child items is expanded to reveal the specified item. In this case, the parent window receives the TVN_ITEMEXPANDING and TVN_ITEMEXPANDED notification messages.

Using the TreeView_SelectItem macro is equivalent to sending the TVM_SELECTITEM message with the *flag* parameter set to the TVGN_CARET

42 value. Using the TreeView_SelectDropTarget macro is equivalent to sending the message with *flag* set to the TVGN_DROPHILITE value.

TVM_SETIMAGELIST

```
TVM_SETIMAGELIST
wParam = (WPARAM) iImage;
lParam = (LPARAM) (HIMAGELIST) himl;

// Corresponding macro
HIMAGELIST TreeView_SetImageList(hwnd, himl, iImage);
```

Sets the normal or state image list for a tree view control and redraws the control using the new images. You can send this message explicitly or by using the TreeView_SetImageList macro.
- Returns the handle of the previous image list, if any or NULL otherwise.

*hwnd* and *himl*
    Handle of the tree view control, and the handle of the image list. If *himl* is NULL, all images are removed from the tree view control.

*iImage*
    Type of image list to set. For a list of possible values, see the description of the TVM_GETIMAGELIST message.

TVM_SETINDENT

```
TVM_SETINDENT
wParam = (WPARAM) indent;
lParam = 0;

// Corresponding macro
BOOL TreeView_SetIndent(hwnd, indent);
```

Sets the width of indentation for a tree view control and redraws the control to reflect the new width. You can send this message explicitly or by using the TreeView_SetIndent macro.
- No return value.

*indent*
    Width, in pixels, of the indentation. If *indent* is less than the system-defined minimum width, the new width is set to the system-defined minimum.

*hwnd*
    Handle of the tree view control.

43

TVM_SETITEM

```
TVM_SETITEM
wParam = 0;
lParam = (LPARAM) (const TV_ITEM FAR*) pitem;

// Corresponding macro
BOOL TreeView_SetItem(hwnd, pitem);
```

Sets some or all of a tree view item's attributes. You can send this message explicitly or by using the TreeView_SetItem macro.
- Returns 0 if successful or −1 otherwise.

*hwnd*
Handle of the tree view control.

*pitem*
Address of a TV_ITEM structure that contains the new item attributes. The hItem member identifies the item, and the mask member specifies which attributes to set.

If mask specifies the TVIF_TEXT value, the pszText member is the address of a null-terminated string and the cchTextMax member is ignored.

If mask specifies the TVIF_STATE value, the stateMask member specifies which item states to change and the state member contains the values for those states.

TVM_SORTCHILDREN

```
TVM_SORTCHILDREN
wParam = (WPARAM) fRecurse;
lParam = (LPARAM) (HTREEITEM) hitem;

// Corresponding macro
BOOL TreeView_SortChildren(hwnd, hitem, fRecurse);
```

Sorts the child items of the given parent item in a tree view control. You can send this message explicitly or by using the TreeView_SortChildren macro.
- Returns TRUE if successful or FALSE otherwise.

*hwnd* and *hitem*
Handle of the tree view control, and the handle of the parent item whose child items are to be sorted.

*fRecurse*
Variable specifying whether to recursively sort the child items. If this parameter is TRUE, all levels of child items descending from the given parent item are sorted. Otherwise, only the immediate child items are sorted.

44

TVM_SORTCHILDRENCB

```
TVM_SORTCHILDRENCB
wParam = (WPARAM) fRecurse;
lParam = (LPARAM) (LPTV_SORTCB) psort;

// Corresponding macro
BOOL TreeView_SortChildrenCB(hwnd, psort, fRecurse);
```

Sorts tree view items using an application-defined callback function that compares the items. You can send this message explicitly or by using the TreeView_SortChildrenCB macro.
- Returns TRUE if successful or FALSE otherwise.

*hwnd*
    Handle of the tree view control.

*psort*
    Address of a TV_SORTCB structure. The lpfnCompare member is the address of the application-defined comparison function. It is called during the sort operation each time the relative order of two list items needs to be compared. For more information about the comparison function, see the description of the TV_SORTCB structure.

*fRecurse*
    Variable specifying whether to recursively sort the child items. If this parameter is TRUE, all levels of child items descending from the given parent item are sorted. Otherwise, only the immediate child items are sorted.

Notification Messages

A tree view control sends notifications, in the form of WM_NOTIFY messages, to its parent window to notify it about events.

TVN_BEGINDRAG

```
TVN_BEGINDRAG
pnmtv = (NM_TREEVIEW FAR *) lParam
```

Notifies a tree view control's parent window that a drag-and-drop operation involving the left mouse button is being initiated. This notification message is sent in the form of a WM_NOTIFY message. A tree view that has the TVS_DISABLEDRAGDROP style does not send this notification.
- No return value.

*pnmtv*
    Address of an NM_TREEVIEW structure. The itemNew member is a TV_ITEM structure that contains valid information about the item being dragged in the hItem, state, and lParam members. The ptDrag member
specifies the current screen coordinates of the mouse.

TVN_BEGINLABELEDIT

```
TVN_BEGINLABELEDIT
ptvdi = (TV_DISPINFO FAR *) lParam
```

Notifies a tree view control's parent window about the start of label editing for an
item. This notification message is sent in the form of a WM_NOTIFY message.
- Returns FALSE to cancel label editing.

*ptvdi*
    Address of a TV_DISPINFO structure. The item member is a TV_ITEM
    structure that contains valid information about the item being edited in the
    hItem, state, and lParam members.

TVN_BEGINRDRAG

```
TVN_BEGINRDRAG
pnmtv = (NM_TREEVIEW FAR *) lParam
```

Notifies a tree view control's parent window about the initiation of a drag-and-drop
operation involving the right mouse button. This notification message is sent in the
form of a WM_NOTIFY message.
- No return value.

*pnmtv*
    Address of an NM_TREEVIEW structure. The itemNew member is a
    TV_ITEM structure that contains valid information about the item to be
    dragged in the hItem, state, and lParam members. The ptDrag member
    specifies the current screen coordinates of the mouse.

TVN_DELETEITEM

```
TVN_DELETEITEM
pnmtv = (NM_TREEVIEW FAR *) lParam
```

Notifies a tree view control's parent window that an item has been deleted. This
notification message is sent in the form of a WM_NOTIFY message.
- No return value.

46

*pnmtv*
    Address of an NM_TREEVIEW structure. The infoOld member is a TV_ITEM structure that contains valid information about the item that was deleted in the hItem and lParam members.

TVN_ENDLABELEDIT

```
TVN_ENDLABELEDIT
ptvdi = (TV_DISPINFO FAR *) lParam
```

Notifies a tree view control's parent window about the end of label editing for an item. This notification message is sent in the form of a WM_NOTIFY message.
- No return value.

*ptvdi*
    Address of a TV_DISPINFO structure. The item member is a TV_ITEM structure that contains valid information about the item that was edited in the hItem and lParam members.

TVN_GETDISPINFO

```
TVN_GETDISPINFO
ptvdi = (TV_DISPINFO FAR *) lParam
```

Requests that a tree view control's parent window provide information needed to display or sort an item. This notification message is sent in the form of a WM_NOTIFY message.
- No return value

*ptvdi*
    Address of a TV_DISPINFO structure. The item member is a TV_ITEM structure whose mask, hItem, state, and lParam members specify the type of information required. You must fill the members of the structure with the appropriate information.

TVN_ITEMEXPANDED

```
TVN_ITEMEXPANDED
pnmtv = (NM_TREEVIEW FAR *) lParam
```

Notifies a tree view control's parent window that a parent item's list of child items has expanded or collapsed. This notification message is sent in the form of a WM_NOTIFY message.
- No return value.

47

*pnmtv*
    Address of an NM_TREEVIEW structure. The itemNew member is a TV_ITEM structure that contains valid information about the parent item in the hItem, state, and lParam members. The action member indicates whether the list expanded or collapsed. For a list of possible values, see the description of the TVM_EXPAND message.

TVN_ITEMEXPANDING

```
TVN_ITEMEXPANDING
pnmtv = (NM_TREEVIEW FAR *) lParam
```

Notifies a tree view control's parent window that a parent item's list of child items is about to expand or collapse. This notification message is sent in the form of a WM_NOTIFY message.
- Returns TRUE to prevent the list from expanding or collapsing.

*pnmtv*
    Address of an NM_TREEVIEW structure. The itemNew member is a TV_ITEM structure that contains valid information about the parent item in the hItem, state, and lParam members. The action member indicates whether the list is to expand or collapse. For a list of possible values, see the description of the TVM_EXPAND message.

TVN_KEYDOWN

```
TVN_ITEMEXPANDING
ptvkd = (TV_KEYDOWN FAR *) lParam
```

Notifies a tree view control's parent window that the user pressed a key and the tree view control has the input focus. This notification message is sent in the form of a WM_NOTIFY message.
- No return value.

*ptvkd*
    Address of a TV_KEYDOWN structure. The wVKey member specifies the virtual-key code.

TVN_SELCHANGED

```
TVN_SELCHANGED
pnmtv = (NM_TREEVIEW FAR *) lParam
```

48

Notifies a tree view control's parent window that the selection has changed from one item to another. This notification message is sent in the form of a WM_NOTIFY message.
- No return value.

*pnmtv*
    Address of an NM_TREEVIEW structure. The itemOld and itemNew members contain valid information about the previously selected item and the newly selected item. The action member indicates the type of action that caused the selection to change. It can be one of these values:

| | |
|---|---|
| TVC_BYKEYBOARD | By a key stroke |
| TVC_BYMOUSE | By a mouse click |
| TVC_UNKNOWN | Unknown |

TVN_SELCHANGING

```
TVN_SELCHANGING
pnmtv = (NM_TREEVIEW FAR *) lParam
```

Notifies a tree view control's parent window that the selection is about to change from one item to another. This notification message is sent in the form of a WM_NOTIFY message.
- Returns TRUE to prevent the selection from changing.

*pnmtv*
    Address of an NM_TREEVIEW structure. The itemOld and itemNew members contain valid information about the currently selected item and the newly selected item. The action member indicates whether a mouse or keyboard action is causing the selection to change. For a list of possible values, see the description of the TVN_SELCHANGED notification.

TVN_SETDISPINFO

```
TVN_SETDISPINFO
ptvdi = (TV_DISPINFO FAR *) lParam
```

Notifies a tree view control's parent window that it must update the information it maintains about an item. This notification message is sent in the form of a WM_NOTIFY message.
- No return value

*ptvdi*
    Address of a TV_DISPINFO structure. The item member is a TV_ITEM structure that contains valid information about the item in the hItem and lParam members.

49

Structures

The following structures are used by tree view control messages.

NM_TREEVIEW

```
typedef struct _NM_TREEVIEW {   nmtv
    NMHDR   hdr;        // required for all WM_NOTIFY messages
    UINT    action;     // notification-specific action flag
    TV_ITEM itemOld;    // see below
    TV_ITEM itemNew;    // see below
    POINT   ptDrag;     // see below
} NM_TREEVIEW;
typedef NM_TREEVIEW FAR *LPNM_TREEVIEW;
```

Contains information about a tree view notification message.
itemOld and itemNew
    Address of TV_ITEM structures that contain information about the new and old item states. Both members are zero for notifications that do not use them.

ptDrag
    A POINT structure that contains the client coordinates of the mouse at the time the event occurred that caused the notification to be sent.

The address of this structure is specified as the *lParam* parameter of the WM_NOTIFY message for several tree view notifications.

TV_DISPINFO

```
typedef struct _TV_DISPINFO {  tvdi
    NMHDR   hdr;     // required for all WM_NOTIFY messages
    TV_ITEM item;    // see below
} TV_DISPINFO;
```

Retrieves and sets information about a tree view item.
item
    A TV_ITEM structure that identifies and contains information about the tree view item. The mask member specifies which information is being set or queried. It can be one or more of these values:

| | |
|---|---|
| TVIF_IMAGE | The iImage member specifies, or is to receive, the index of the item's icon in the image list. |
| TVIF_STATE | The state member specifies, or is to receive, the state of the item. |
| TVIF_TEXT | The pszText member specifies the new item text or the address of a buffer that is to receive the item text. |

If the structure is receiving item text, you typically copy the text to the buffer pointed to by the pszText member of the TV_ITEM structure. However, you can return a pointer to a string in the pszText member instead. If you do so, you cannot change or delete the string until the corresponding item text is deleted or two additional TVN_GETDISPINFO notification messages have been sent.

A tree view control sends a notification to get or set an item's text if the pszText member of the item's TV_ITEM structure is LPSTR_TEXTCALLBACK. A tree view control sends a notification to get or set an item's icon or small icon if the iImage or iSelectedImage member of the TV_ITEM structure is I_IMAGECALLBACK. A tree view control sends a notification to get or set an item's state flags if the corresponding bits are set in the control's state callback mask. The notifications are sent only if the parent window is responsible for maintaining certain information. The TV_ITEM structure is used by the TVN_GETDISPINFO and TVN_SETDISPINFO notification messages.

TV_HITTESTINFO

```
typedef struct _TVHITTESTINFO {  tvhtst
    POINT      pt;      // client coordinates of point to test
    UINT       flags;   // see below
    HTREEITEM  hItem;   // handle of item that occupies point
} TV_HITTESTINFO, FAR *LPTV_HITTESTINFO;
```

Contains information used to determine the location of a point relative to a tree view control.

flags

Variable that receives information about the results of a hit test. It can be one or more of these values:

| | |
|---|---|
| TVHT_ABOVE | Above the client area |
| TVHT_BELOW | Below the client area |
| TVHT_NOWHERE | In the client area but below the last item |
| TVHT_ONITEM | On the bitmap or label associated with an item |
| TVHT_ONITEMBUTTON | On the button associated with an item |
| TVHT_ONITEMICON | On the bitmap associated with an item |
| TVHT_ONITEMINDENT | In the indentation associated with an item |
| TVHT_ONITEMLABEL | On the label (string) associated with an item |
| TVHT_ONITEMRIGHT | In the area to the right of an item |
| TVHT_ONITEMSTATEICON | On the state icon for a tree view item that is in a user-defined state |
| TVHT_TOLEFT | To the right of the client area |
| TVHT_TORIGHT | To the left of the client area |

This structure is used by the TVM_HITTEST message.

51

TV_INSERTSTRUCT

```
typedef struct _TV_INSERTSTRUCT {   tvins
    HTREEITEM hParent;      // see below
    HTREEITEM hInsertAfter; // see below
    TV_ITEM   item;         // information about item to add
} TV_INSERTSTRUCT, FAR *LPTV_INSERTSTRUCT;
```

Contains information used to add a new item to a tree view control.

hParent
    Handle of the parent item. If this parameter is the TVI_ROOT value or NULL, the item is inserted at the root of the tree view control.

hInsertAfter
    Handle of the item after which the new item is to be inserted or one of these values:

| | |
|---|---|
| TVI_FIRST | Inserts the item at the beginning of the list. |
| TVI_LAST | Inserts the item at the beginning of the list. |
| TVI_SORT | Inserts the item into the list in alphabetical order. |

This structure is used by the TVM_INSERTITEM message.

TV_ITEM

```
typedef struct _TV_ITEM {   tvi
    UINT      mask;           // see below
    HTREEITEM hItem;          // item this structure refers to
    UINT      state;          // see below
    UINT      stateMask;      // see below
    LPSTR     pszText;        // see below
    int       cchTextMax;     // see below
    int       iImage;         // see below
    int       iSelectedImage; // see below
    int       cChildren;      // see below
    LPARAM    lParam;         // 32-bit value to associate with item
} TV_ITEM, FAR *LPTV_ITEM;
```

Specifies or receives attributes of a tree view item.

mask
    Array of flags that indicate which of the other structure members contain valid data or which are to be filled in. It can be a combination of these values:

| | |
|---|---|
| TVIF_CHILDREN | The cChildren member is valid. |
| TVIF_HANDLE | The hItem member is valid. |
| TVIF_IMAGE | The iImage member is valid. |
| TVIF_PARAM | The lParam member is valid. |

52

| TVIF_SELECTEDIMAGE | The iSelectedImage member is valid. |
| --- | --- |
| TVIF_STATE | The state and stateMask members are valid. |
| TVIF_TEXT | The pszText and cchTextMax members are valid. | state and stateMask
    Variables specifying the current state of the item and the valid states of the item. It can be any valid combination of state values. For a list of item states, see "Constants" later in this chapter.

pszText
    Address of a null-terminated string containing the item text if the structure specifies item attributes. If this member is the LPSTR_TEXTCALLBACK value, the parent window is responsible for storing the name. In this case, the tree view control sends the parent window a TVN_GETDISPINFO notification message when it needs the item text for displaying, sorting, or editing, and the tree view sends a TVN_SETDISPINFO notification when the item text changes.

If the structure is receiving item attributes, this member is the address of the buffer that receives the item text.

cchTextMax
    Size of the buffer pointed to by the pszText member if the structure is receiving item attributes. This member is ignored if the structure specifies item attributes.

iImage and iSelectedImage
    Indexes of the icon image and selected icon image within the image list. If either member is the I_IMAGECALLBACK value, the parent window is responsible for storing the corresponding images. In this case, the tree view control sends the parent a TVN_GETDISPINFO notification message when it needs to display the images and a TVN_SETDISPINFO notification message when the images change.

cChildren
    Number of child items associated with the item. If this member is the I_CHILDRENCALLBACK value, the parent window is responsible for drawing the child items. In this case, the tree view control sends the parent a TVN_GETDISPINFO notification message when it needs to display the child items and a TVN_SETDISPINFO notification message when the attributes of a child item changes.

This structure is used by the TVM_GETITEM, TVM_SETITEM, and TVM_INSERTITEM messages. It is also included with many of the notification messages. When the structure is used to retrieve item information, only the structure members indicated by the mask member contain valid data. All other members are invalid.

TV_KEYDOWN

```
typedef struct _TV_KEYDOWN { tvkd
```

```
    NMHDR  hdr;      // required for all WM_NOTIFY messages
    WORD   wVKey;    // virtual key code
    UINT   flags;    // always zero
} TV_KEYDOWN;
```

Contains information about a keyboard event in a tree view control.
This structure is used by the TVN_KEYDOWN notification message.

TV_SORTCB

```
typedef struct _TV_SORTCB { tvscb
    HTREEITEM    hParent;       // handle of parent item
    PFNTVCOMPARE lpfnCompare;   // see below
    LPARAM       lParam;        // application-defined 32-bit value
} TV_SORTCB, FAR *LPTV_SORTCB;
```

Contains information used to sort child items in a tree view control.
lpfnCompare
> Address of an application-defined comparison function. It is called during a sort operation each time the relative order of two list items needs to be compared. The comparison function has the following form:

```
int CALLBACK CompareFunc(LPARAM lParam1, LPARAM lParam2,
    LPARAM lParamSort);
```

> The comparison function must return a negative value if the first item should precede the second, a positive value if the first item should follow the second, or zero if the two items are equivalent.

> The *lParam1* and *lParam2* parameters correspond to the lParam member of the TV_ITEM structure for the two items being compared. The *lParamSort* parameter corresponds to the lParam member of the TV_SORTCB structure that was passed with the TVM_SORTCHILDRENCB message.

This structure is used by the TVM_SORTCHILDRENCB message.

Constants

The tables in following sections describe window style flags and item state flags used with tree view controls.

Tree View Window Styles

A tree view's window style can include one or more of these values:

| | |
|---|---|
| TVS_DISABLEDRAGDROP | Prevents the tree view control from sending TVN_BEGINDRAG notification messages. |
| TVS_EDITLABELS | Allows the user to edit the labels of tree view items. |

We claim:

1. In a computer system having a processor for running a first and a second application program and an output device, a method comprising the steps of:
providing a child window control as a system resource that may be used by the first and the second application program to display a list of items as a hierarchical tree on the output device;
using the child window control by the first application program to display at least a portion of a list of items as a hierarchical tree on the output device; and
using the child window control by the second application program to display at least a portion of another list of items as a hierarchical tree on the output device.

2. The method of claim 1 wherein the output device is a video display and wherein the step of using the child window control by the first application program to display at least a portion of the list of items as a hierarchical tree on the output device comprises the step of using the child window control by the first application program to display at least a portion of the list of items as a hierarchical tree of at least two levels on the video display, wherein visual distinctions are provided to distinguish the levels of the hierarchical tree.

3. The method of claim 1 wherein the list of items of which at least a portion are displayed by the second application program using the child window control is a same list as the list of items of which at least a portion are displayed by the first application program using the child window control.

4. The method of claim 1 wherein the list of items of which at least a portion are displayed by the second application program using the child window control is a different list of items than the list of items of which at least a portion are displayed by the first application program using the child window control.

5. The method of claim 1 wherein only a portion of the list of items are displayed in the using step.

6. The method of claim 1 wherein the hierarchical tree is expandable such that additional levels of items may be displayed on the output device using the child window control and wherein said method further comprises the step of expanding the hierarchical tree such that at least one additional level of items is displayed on the output device by the first application program using the child window control.

7. The method of claim 6 wherein the step of using the child window control by the first application program to display at least a portion of the list of items as the hierarchical tree on the output device comprises the sub-step of providing a visual indicator at a location in the hierarchical tree to indicate that the tree may be expanded at the location to display an additional level of items.

8. The method of claim 1 wherein the hierarchical tree is collapsible such that at least one selected level of the items of the hierarchical tree may be collapsed so that the selected level of items is no longer displayed on the output device using the child window control and wherein said method further comprises the step of collapsing the hierarchical tree such that the selected level of items is not displayed on the output device by the first application using the child window control.

9. The method of claim 8 wherein the step of using the child window control by the first application program to display at least a portion of the list of items as the hierarchical tree on the output device comprises the sub-step of providing a visual indicator at a location in the hierarchical tree to indicate that the tree may be collapsed at the location to no longer display the selected level of items.

10. The method of claim 1 wherein the items are file system structures.

11. In a computer system having an output device and an input device, a method comprising the steps of:
displaying a hierarchical tree of items having at least two levels of items on the output device as part of a window control;
in response to a user using the input device, selecting one of the items displayed in the hierarchical tree of items; and
expanding the hierarchical tree of items independently of the selecting so that an additional level of items is displayed as part of the hierarchical tree of items on the output device such that the expanding occurs in response to a user action that does not result in another selection of one of the items.

12. The method of claim 11 where the computer system includes application programs and wherein the child window control is a system resource for use by the application programs.

13. The method of claim 11 wherein the step of selecting one of the items comprises the sub-step of providing a visual cue on the output device that identifies which item has been selected.

14. The method of claim 11 wherein the step of displaying the hierarchical tree of items comprises the sub-step of displaying at least one visual cue with the hierarchical tree on the output device which indicates where the hierarchical tree may be expanded.

15. The method of claim 11 wherein the expanding step is performed in response to the user using the input device.

16. In a computer system having an output device and an input device, a method comprising the steps of:
displaying a hierarchical tree of items having at least two levels of items on the output device as part of a child window control;
in response to a user using the input device, selecting one of the items displayed in the hierarchical tree of items; and
collapsing the hierarchical tree of items independently of the selecting so that one of the level of items of the hierarchical tree that was displayed in the displaying step is no longer displayed as part of the hierarchical tree on the output device in response to a user action that does not result on another selection of one of the items.

17. The method of claim 16 wherein the computer system includes application programs and wherein the child window control is a system resource for use by the application programs.

18. The method of claim 16 wherein the step of selecting one of the items comprises the sub-step of providing a visual cue on the output device that indicates which item has been selected.

19. The method of claim 16 wherein the step of displaying the hierarchical tree of items comprises the sub-step of displaying at least one visual cue with the hierarchical tree on the output device which indicates where the hierarchical tree may be collapsed.

20. The method of claim 16 wherein the collapsing step is performed in response to the user using the input device.

21. In a computer system having an output device, a method comprising the steps of:
displaying a hierarchical tree of items in a window on the output device, wherein for each item a label is displayed;

providing a mechanism for in-place editing of the labels in the hierarchical tree of items; and using the mechanism for in-place editing to enable a user to perform in-place editing of the label for one of the items in the hierarchical tree.

22. A computer system comprising
(a) an output device;
(b) a storage device holding
   (i) a first application program;
   (ii) a second application program;
   (iii) code for a child window control that is a system resource and that may be used by the first and the second application program to display a list of items as a hierarchical tree of at least two levels of items on the output device; and
(c) a processor for running the first application program and the code for the child window control to display the list of items as the hierarchical tree on the output device, and for running the second application program and the code for the child window control to display another list of items as the hierarchical tree on the output device.

23. The computer system of claim 22 wherein the child window control further comprises:
   (i) means for selecting an item in the hierarchical tree; and
   (ii) means for providing a visual cue that identifies which item in the hierarchical tree is currently selected.

24. The computer system of claim 23 wherein the child window control further comprises a means for expanding the hierarchical tree of items to display an additional level of items in the hierarchical tree on the output device without changing which item is currently selected.

25. The computer system of claim 23 wherein the child window control further comprises a means for collapsing the hierarchical tree of items to no longer display a level of the hierarchical tree on the output device, without changing which item is currently selected.

26. The computer system of claim 23 further comprising a callback mechanism for calling back from the child window control to the first application program to obtain display information for displaying an item in the hierarchical display when needed by the child window control.

27. The computer system of claim 22 further comprising an in-place editing mechanism for enabling a user to perform in-place editing of items as displayed on the output device.

\* \* \* \* \*

UNITED STATES PATENT AND TRADEMARK OFFICE
CERTIFICATE OF CORRECTION

PATENT NO. : 5,838,319
DATED : November 17, 1998
INVENTOR(S) : C.J. Guzak et al.

It is certified that error appears in the above-indentified patent and that said Letters Patent is hereby corrected as shown below:

| COLUMN | LINE | |
|---|---|---|
| 4 | 22 | "{ // tvins" should read --{ tvins-- |
| 4 | 45 | "{ // tvi" should read --{ tvi-- |
| 4 | 46-54 | Right-hand column beginning with "mask;" should line up vertically under "_TV_ITEM" |
| 4 | 56 | ""masks"" should read --"mask"-- |
| 4 | 66 | "psztext" should read --pszText-- |
| 5 | 51 | "an other" should read --and the other-- |
| 5 | 65 | After "items" delete " " |

Signed and Sealed this

Fifteenth Day of June, 1999

*Attest:*

Q. TODD DICKINSON

*Attesting Officer*  Acting Commissioner of Patents and Trademarks